United States Patent
Gandhi et al.

(10) Patent No.: US 10,635,600 B2
(45) Date of Patent: Apr. 28, 2020

(54) DECOUPLING MEMORY METADATA GRANULARITY FROM PAGE SIZE

(71) Applicant: VMware, Inc., Palo Alto, CA (US)

(72) Inventors: Jayneel Gandhi, Sunnyvale, CA (US); Christopher J. Rossbach, West Lake Hills, TX (US); Timothy Merrifield, Austin, TX (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/916,173

(22) Filed: Mar. 8, 2018

(65) Prior Publication Data

US 2019/0278713 A1    Sep. 12, 2019

(51) Int. Cl.
*G06F 12/1009* (2016.01)
*G06F 12/1027* (2016.01)

(52) U.S. Cl.
CPC ...... *G06F 12/1009* (2013.01); *G06F 12/1027* (2013.01); *G06F 2212/1008* (2013.01); *G06F 2212/1012* (2013.01); *G06F 2212/652* (2013.01); *G06F 2212/657* (2013.01)

(58) Field of Classification Search
CPC .................. G06F 12/1009; G06F 12/1027
See application file for complete search history.

(56) References Cited

U.S. PATENT DOCUMENTS

| | | | | |
|---|---|---|---|---|
| 7,596,654 B1* | 9/2009 | Wong | ........... | G06F 12/0813 703/21 |
| 2009/0172243 A1* | 7/2009 | Champagne | ........ | G06F 12/1027 711/3 |
| 2011/0185112 A1* | 7/2011 | Goss | ........... | G06F 12/0246 711/103 |
| 2013/0019072 A1* | 1/2013 | Strasser | ........... | G06F 11/1044 711/154 |
| 2013/0339406 A1* | 12/2013 | Kanfi | ........... | G06F 16/122 707/825 |
| 2016/0378668 A1* | 12/2016 | Roberts | ........... | G06F 12/0862 711/137 |
| 2018/0011792 A1* | 1/2018 | Koker | ........... | G06F 12/0804 |

OTHER PUBLICATIONS http://blog.couchbase.com/often-overlooked-linux-os-tweaks. [Mar. 2014].
https://www.percona.com/blog/2014/07/23/why-tokudb-hates-transparent-hugepages/. [Jul. 2014].
http://man7.org/linux/man-pages/man2/mmap.2.html. [Accessed Sep. 2017].
https://docs.mongodb.org/manual/tutorial/transparent-huge-pages/. [Accessed Apr. 2016].

(Continued)

*Primary Examiner* — Edward J Dudek, Jr.
(74) *Attorney, Agent, or Firm* — Patterson + Sheridan, LLP

(57) ABSTRACT

The disclosure provides an approach for tracking metadata (e.g., accessed and dirty bits) of page tables at finer granularity than the size of the page tables. A disclosed herein, modification to existing hardware design may enable finer page table granularity of metadata, leading to more precise representation of the state of memory and an improvement to system performance and efficiency. Finer grain dirty metadata can dramatically improve the efficiency and simplicity of subsystems.

20 Claims, 17 Drawing Sheets

(56) References Cited

OTHER PUBLICATIONS http://www.nuodb.com/techblog/linux-transparent-huge-pages-jemalloc-and-nuodb. [May 2014].
http://parsec.cs.princeton.edu/. [Accessed Apr. 2016].
http://redis.io/. [Accessed Apr. 2016].
http://redis.io/topics/latency. [Access Apr. 2016].
http://scn.sap.com/people/markmumy/blog/2014/05/22/sap-iq-and-linux-hugepagestransparent-hugepages. [May 2014].
https://www.spec.org/cpu2006/. [Accessed Apr. 2016].
http://docs.splunk.com/Documentation/Splunk/6.1.3/ReleaseNotes/SplunkandTHP. [Dec. 2013].
https://docs.voltdb.com/AdminGuide/adminmemmgt.php. [Accessed Apr. 2016].
Neha Agarwal and Thomas F. Wenisch. Thermostat: Application-transparent page management for two-tiered main memory. In Proceedings of the Twenty-Second International Conference on Architectural Support for Programming Languages and Operating Systems, ASPLOS '17, pp. 631-644, 2017.
Jeongseob Ahn, Seongwook Jin, and Jaehyuk Huh. Revisiting hardware-assisted page walks for virtualized systems. In International Symposium on Computer Architecture (ISCA), 2012.
Jeongseob Ahn, Seongwook Jin, and Jaehyuk Huh. Fast two-level address translation for virtualized systems. In IEEE Transactions on Computers, 2015.
Hanna Alam, Tianhao Zhang, Mattan Erez, and Yoav Etsion. Do-it-yourself virtual memory translation. In Proceedings of the 44th Annual International Symposium on Computer Architecture, ISCA '17, pp. 457-468, New York, NY, USA, 2017. ACM.
Nadav Amit. Optimizing the TLB shootdown algorithm with page access tracking. In 2017 USENIX Annual Technical Conference (USENIX ATC 17), pp. 27-39, Santa Clara, CA, 2017. USENIX Association.
Thomas W. Barr, Alan L. Cox, and Scott Rixner. Translation caching: Skip, don't walk (the page table). In International Symposium on Computer Architecture (ISCA), 2010.
Arkaprava Basu, Mark D. Hill, and Michael M. Swift. Reducing Memory Reference Energy with Opportunistic Virtual Caching. In Proceedings of the 39th Annual International Symposium on Computer Architecture, pp. 297-308, 2012.
Arkapravu Basu, Jayneel Gandhi, Jichuan Chang, Mark D. Hill, and Michael M. Swift. Efficient virtual memory for big memory servers. In International Symposium on Computer Architecture (ISCA), 2013.
Ravi Bhargava, Benjamin Serebrin, Francesco Spadini, and Srilatha Manne. Accelerating Two-dimensional Page Walks for Virtualized Systems. In Proceedings of the 13th International Conference on Architectural Support for Programming Languages and Operating Systems, pp. 26-35, 2008.
Abhishek Bhattacharjee. Large-reach memory management unit caches. In International Symposium on Microarchitecture, 2013.
Abhishek Bhattacharjee, Daniel Lustig, and Margaret Martonosi. Shared last-level TLBs for chip multiprocessors. In IEEE International Symposium on High Performance Computer Architecture (HPCA), 2011.
Abhishek Bhattacharjee and Margaret Martonosi. Characterizing the TLB behavior of emerging parallel workloads on chip multiprocessors. In International Conference on Parallel Architectures and Compilation Techniques (PACT), 2009.
Jeffrey Buell, Daniel Hecht, Jin Heo, Kalyan Saladi, and Reza H. Taheri. Methodology for performance analysis of VMware vSphere under Tier-1 applications. VMware Technical Journal, 2(1), 2013.
Subramanya R. Dulloor, Amitabha Roy, Zheguang Zhao, Narayanan Sundaram, Nadathur Satish, Rajesh Sankaran, Je Jackson, and Karsten Schwan. Data tiering in heterogeneous memory systems. In Proceedings of the Eleventh European Conference on Computer Systems, EuroSys '16, pp. 15:1-15:16, New York, NY, USA, 2016. ACM.
Zhen Fang, Lixin Zhang, John B. Carter, Wilson C. Hsieh, and Sally A. McKee. Reevaluating Online Superpage Promotion with Hardware Support. In Proceedings of the 7th International Symposium on High-Performance Computer Architecture, 2001.
Narayanan Ganapathy and Curt Schimmel. General Purpose Operating System Support for Multiple Page Sizes. In Proceedings of the Annual Conference on USENIX Annual Technical Conference, 1998.
Jayneel Gandhi, , Mark D. Hill, and Michael M. Swift. Exceeding the best of nested and shadow paging. In International Symposium on Computer Architecture (ISCA), 2016.
Jayneel Gandhi, Arkaprava Basu, Mark D. Hill, and Michael M. Swift. Efficient memory virtualization. In International Symposium on Microarchitecture, 2014.
Jayneel Gandhi, Mark D. Hill, and Michael M. Swift. Agile paging: Exceeding the best of nested and shadow paging. In Proceedings of the 43rd International Symposium on Computer Architecture, ISCA '16, pp. 707-718, 2016.
Jayneel Gandhi, Mark D. Hill, and Michael M. Swift. Agile paging for e cient memory virtualization. IEEE Micro, 37 (3):80-86, 2017.
Jayneel Gandhi, Vasileios Karakostas, Furkan Ayar, Adrian Cristal, Mark D. Hill, Kathryn S. McKinley, Mario Nemirovsky, Michael M. Swift, and Osman Unsal. Range Translations for Fast Virtual Memory. IEEE Micro, May 2016.
Mel Gorman and Patrick Healy. Supporting superpage allocation without additional hardware support. In Proceedings of the 7th International Symposium on Memory Management, 2008.
Mel Gorman and Patrick Healy. Performance characteristics of explicit superpage support. In workshorp on the Interaction between Operating Systems and Computer Architecture (WIOSCA), 2010.
Graph500 List. http://www.graph500.org/. [Accessed Apr. 2016].
Fei Guo, Seongbeom Kim, Yury Baskakov, and Ishan Banerjee. Proactively breaking large pages To improve memory overcommitment performance in vmware esxi. In International Conference on Virtual Execution Environments (VEE), 2015.
Jerry L. Hintze and Ray D. Nelson. Violin plots: a box plot-density trace synergism. The American Statistician, 52 (2)181-184, 1998.
Bruce Jacob and Trevor Mudge. Virtual Memory in Contemporary Microprocessors. IEEE Micro, 18(4):60-75, Jul. 1998.
Gokul B. Kandiraju and Anand Sivasubramaniam. Going the distance for TLB prefetching: An application-driven study. In International Symposium on Computer Architecture (ISCA), 2002.
Vasileios Karakostas, Jayneel Gandhi, Furkan Ayar, AdriAan , and Cristal, Mark D. Hill, Kathryn S. McKinley, Mario Nemirovsky, Michael M. Swift, and Osman AlJnsal. Redundant memory mappings for fast access to large memories. In International Symposium on Computer Architecture (ISCA), 2015.
Vasileios Karakostas, Jayneel Gandhi, Adrian Cristal, Mark D. Hill, Kathryn S. McKinley, Mario Nemirovsky, Michael M. Swift, and Osman Unsal. Energy-Efficient Address Translation. In Proceedings of the 2016 IEEE 22nd International Symposium on High Performance Computer Architecture, 2016.
Vasileios Karakostas, Osman Unsal, Mario Nemirovsky, Adrian Cristal, and Michael M. Swift. Performance analysis of ihe memory management unit under scale-out workloads. In IEEE International Symposium on Workload Characterization, Oct. 2014.
Avi Kivity, Yaniv Kamay, Dor Laor, Uri Lublin, and Anthony Liguori. KVM: The linux virtual machine monitor. In Linux Symposium, 2007.
https: //en.wikipedia.org/wiki/Kernel_same-page_merging. [Accessed Apr. 2016].
Youngjin Kwon, Hangchen Yu, Simon Peter, Christopher J. Rossbach, and Emmett Witchel. Coordinated and efficient huge page management with ingens. In 12th USENIX Symposium on Operating Systems Design and Implementation, OSDI 2016, Savannah, GA, USA, Nov. 2-4, 2016., pp. 705-721, 2016.
https://lwn.net/Articles/375096/. [Feb. 2010].
Daniel Lustig, Abhishek Bhattacharjee, and Margaret Martonosi. TLB improvements for chip multiprocessors: Inter-core cooperative prefetchers and shared last-level TLBs. ACM Transactions on Architecture and Code Optimization (TACO), 2013.
Timothy Merrifield and H. Reza Taheri. Performance implications of extended page tables on virtualized x86 processors. In Proceed-

(56) References Cited

OTHER PUBLICATIONS ings of the 12th ACM SIGPLAN/SIGOPS International Conference on Virtual Execution Environments, VEE '16, pp. 25-35, New York, NY, USA, 2016. ACM.
Naveen Muralimanohar, Rajeev Balasubramonian, and Norman P. Jouppi. Cacti 6.0: A tool to understand large caches, 2009.
Juan Navarro, Sitaram Iyer, Peter Druschel, and Alan Cox. Practical, transparent operating system support for superpages. In USENIX Symposium on Operating Systems Design and Implementation (OSDI), 2002.
M.-M. Papadopoulou, Xin Tong, A. Seznec, and A. Moshovos. Prediction-based superpage-friendly TLB designs. In IEEE International Symposium on High Performance Computer Architecture (HPCA), 2015.
Binh Pham, Abhishek Bhattacharjee, Yasuko Eckert, and Gabriel H. Loh. Increasing TLB reach by exploiting clustering in page translations. In IEEE International Symposium on High Performance Computer Architecture (HPCA), 2014.
Binh Pham, Viswanathan Vaidyanathan, Aamer Jaleel, and Abhishek Bhattacharjee. CoLT: Coalesced large-reach TLBs. In International Symposium on Microarchitecture, 2012.
Ashley Saulsbury, Fredrik Dahlgren, and Per Stenstrom. Recency-based TLB preloading. In International Symposium on Computer Architecture (ISCA), 2000.

A. Seznec. Concurrent Support of Multiple Page Sizes on a Skewed Associative TLB. IEEE Trans. Comput., 53 (7):924-927, Jul. 2004.
Richard L. Sites and Richard T. Witek. ALPHA architecture reference manual. Digital Press, Boston, Oxford, Melbourne, 1998.
Stephen Somogyi, Thomas F. Wenisch, Anastassia Ailamaki, Babak Falsafi, and Andreas Moshovos. Spatial memory streaming. In Proceedings of the 33rd Annual International Symposium on Computer Architecture, ISCA '06, pp. 252-263, Washington, DC, USA, 2006. IEEE Computer Society.
Shekhar Srikantaiah and Mahmut Kandemir. Synergistic tlbs for high performance address translation in chip multiprocessors. In International Symposium on Microarchitecture, 2010.
Mark Swanson, Leigh Stoller, and John Carter. Increasing TLB Reach Using Superpages Backed by Shadow Memory. In Proceedings of the 25th Annual International Symposium on Computer Architecture, pp. 204-213, 1998.
M. Talluri and M. D. Hill. Surpassing the TLB performance of superpages with less operating system support. In International Conference on Architectural Support for Programming Languages and Operating Systems (ASPLOS), 1994.
https://lwn.net/Articles/359158/. [Oct. 2009].
Xiaolin Wang, Jiarui Zang, Zhenlin Wang, Yingwei Luo, and Xiaoming Li. Selective Hardware/ Software Memory Virtualization. In Proceedings of the 7th ACM SIGPLAN/SIGOPS International Conference on Virtual Execution Environments, 2011.

* cited by examiner

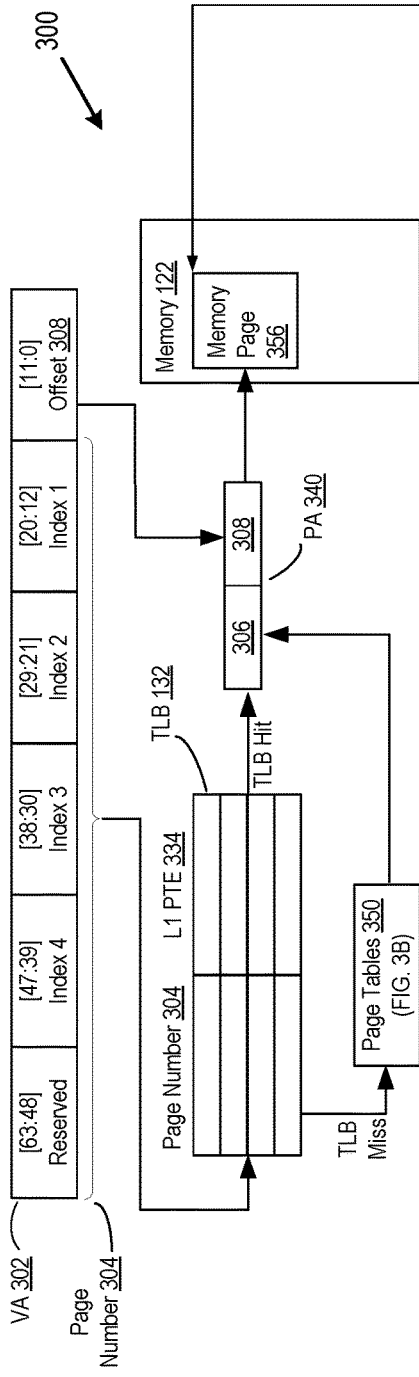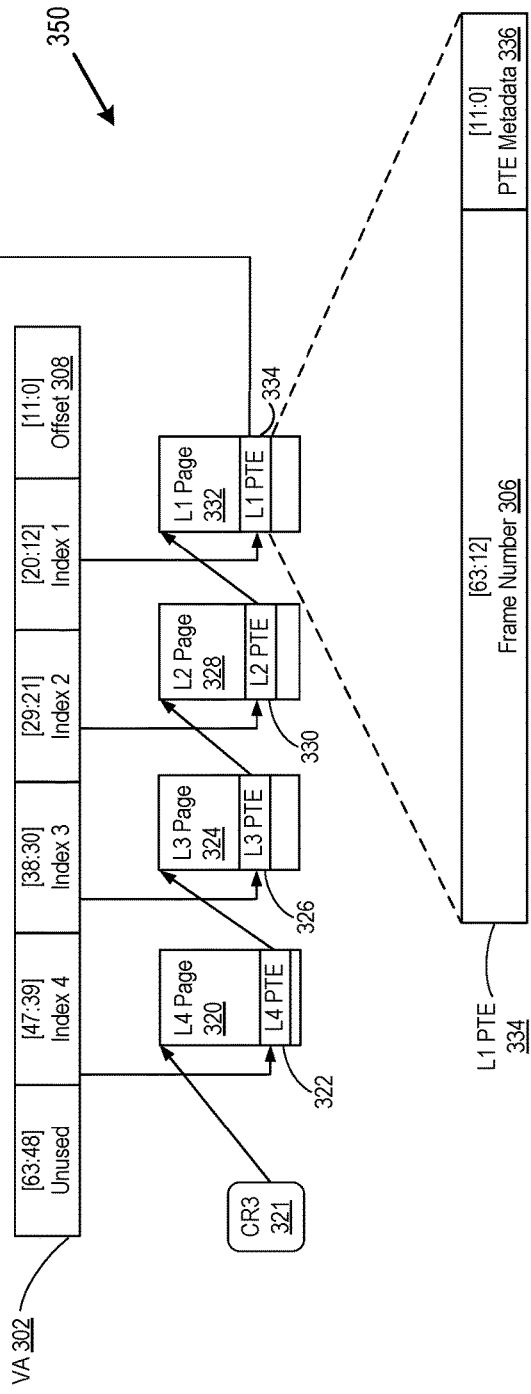
FIG. 3A (Prior Art)
FIG. 3B (Prior Art)

DECOUPLING MEMORY METADATA GRANULARITY FROM PAGE SIZE

BACKGROUND

Modern computers employ virtual memory to decouple processes, e.g., applications running on top of an operating system, from the physical memory addresses backing the address space of the processes. Using virtual memory enables processes to have a large contiguous address space, and allows the computer to run more processes than can fit simultaneously in their entirety in the available physical memory (i.e., to "over-commit" memory). To do this, virtual memory space is divided into pages of a fixed size (for example, x86 architectures use page sizes of 4 KB, 2 MB, or 1 GB), and each page of the virtual memory space either maps onto a page within the physical memory of the same page size or it maps to nothing. Much of the description in this patent will be in terms of x86 architectures. However, a person of skill in the art will understand how to apply the teachings of the invention to other processor architectures.

Translation of a virtual memory address to a physical memory address is done by traversing page tables in memory that contain mapping information. To speed up translation, a translation look-aside buffer (TLB) is typically used. The TLB provides faster translation of virtual addresses to physical addresses than does accessing page tables in memory because the TLB can provide the beginning-to-end mapping in a single step, and because the TLB can be implemented in a small (and, therefore, fast to access) data structure closer to or in the central processing unit (CPU) itself. The TLB is limited in size and it is possible that a virtual memory page cannot be found in the TLB. Whenever this happens, a "TLB miss" occurs, and the mapping has to be performed by a traversal of the page tables, commonly known as a "page walk," a much slower process than look-ups in the TLB.

In virtualized computer systems, where multiple virtual machines, each having an operating system and applications (or processes) running therein, can be configured to run on a single hardware platform, memory management for the virtual machines is carried out by the emulated memory management units (MMUs). One emulated MMU is provided for each virtual machine and the emulated MMU manages the mappings of guest virtual addresses directly to physical memory addresses, also referred to as machine memory addresses, using shadow page tables. Shadow page tables have the same structure as conventional page tables and, as with conventional page tables, shadow page tables need not be traversed if the guest virtual address that needs to be mapped has an entry in the TLB.

Another way to support address translation for a virtualized system is through hardware-assisted virtualization. A CPU can include hardware-assisted virtualization features, such as support for hardware virtualization of MMU. For example, modern x86 processors commercially available from Intel Corporation include support for MMU virtualization using extended page tables (EPTs). Likewise, modern x86 processors from Advanced Micro Devices, Inc. include support for MMU virtualization using Rapid Virtualization Indexing (RVI). Other processor platforms may support similar MMU virtualization. In general, a CPU can implement hardware MMU virtualization using nested page tables (NPTs). In a virtualized computing system, a guest OS in a VM maintains page tables (referred to as guest page tables) for translating virtual addresses to addresses for a virtual memory provided by the hypervisor (referred to as guest-physical addresses). The hypervisor maintains NPTs that translate guest-physical addresses to physical addresses for system memory (referred to as host-physical addresses or machine addresses). Each of the guest OS and the hypervisor exposes the guest paging structures and the NPTs, respectively, to the CPU. MMU translates virtual addresses to host-physical addresses by walking the guest page structures to obtain guest-physical addresses, which are used to walk the NPTs to obtain host-physical addresses.

Both conventional page tables and shadow page tables are hierarchically arranged and a pointer to the top-level, root table is stored in a register. In x86 architectures, this register is known as the CR3 register, and it should be recognized that non-x86 architectures employing page tables may have different structures and accessed in a different manner. A series of intermediate-level tables is traversed to reach bottom-level ("terminal") page tables that have page table entries (PTEs) containing pointers to memory pages and auxiliary information including an accessed bit (A bit), a dirty bit (D bit), and various other bits. The A bit, if set to one, indicates that the memory page referenced by the entry has been accessed since the A bit was last cleared. The D bit, if set to one, indicates that the memory page referenced by the entry has been modified since the D bit was last cleared. The dirty bit may be cleared, i.e., set to zero, when the contents of the modified memory page are committed to disk.

A bits and D bits are examined by various processes before taking some action. In a virtualized computer system, D bits of PTEs are continuously examined during a process for performing backups and during a process for migrating the executing state of virtual machines, to identify those memory pages that have been modified and to transmit to the backup target machine or the migration target machine only those memory pages that have been modified. Alternatively, an operation known as a "diff" operation may be performed on the memory pages that have been modified to identify the changed portions of the memory pages, and only the changed portions are transmitted to the target machine.

When page sizes are large and metadata granularity is coarse, the efficiency of processes is compromised. As used herein, the term "metadata" is used to refer to data that describes and/or gives information about other data. As used herein, the term "granularity" refers to the specificity of a metadata bit. For example, a dirty bit granularity of 16 KB for a page table means that a dirty bit denotes whether a change has occurred within 16 KB chunks of page table memory. A granularity that is "finer" than 16 KB is, for example, an 8 KB granularity, in which a single dirty bit denotes whether a change has occurred within 8 KB chunks of page table memory. A granularity that is "coarser" that 16 KB is, for example, a 32 KB granularity, in which a single dirty bit denotes whether a change has occurred within 32 KB chunks of page table memory.

System software is critically dependent on memory metadata to efficiently manage memory. Such metadata, for example per-page access and dirty bits, enables system software to estimate how frequently a page is accessed or modified, which in turn informs subsystems such as transparent huge page support (THP), page reclamation, and kernel same-page merging (KSM). For example, page reclamation handles memory pressure by swapping out pages infrequently accessed by one process, enabling the OS to allocate pages to another process which needs them. The success of such policies depends heavily on the granularity of the metadata used to predict access and modification frequencies. Decisions taken based on metadata can profoundly impact the performance of workloads and utilization of the system.

System-level services such as swapping pages to disk and cache coherence may be inefficient with coarse metadata granularity. A single dirty bit per 2 MB or 1 GB page gives system software a very coarse hint about whether the contents of a page have been updated, forcing software to choose between blindly transferring page contents which may not have been updated, or inducing overheads by using smaller pages. Common computer processes such as the backup process and the migration process are compromised by coarse granularity, because any modification of a memory page regardless of the size of the modification will cause that memory page to be backed up or migrated. For example, if the memory page size is 2 MB and 8 bytes were written to that memory page, the entire 2 MB page may need to be backed up or migrated.

SUMMARY

Embodiments provide a method of translating a virtual address to a physical address. The method is executed by the CPU, and the CPU is configured to track metadata with a metadata granularity magnitude that is smaller than the size of memory pages used. The method comprising the steps of receiving an operation to be performed on data stored at the virtual address and locating a page table entry (PTE) within a page table based on the virtual address, the PTE containing a frame number. The method further comprises locating a metadata registry entry (MRE) within a metadata registry (MR) that corresponds to the PTE based on the virtual address, the MRE containing metadata for a portion of memory, the frame number pointing to the portion of memory. The method also comprises updating the metadata in the MRE based on the operation.

Further embodiments include a non-transitory computer-readable storage medium storing instructions that, when executed by a computing system, cause the computing device to perform the method set forth above, and a computing system programmed to carry out the method set forth above.

BRIEF DESCRIPTION OF THE DRAWINGS

FIG. 3A depicts a block diagram of dataflow for translating a virtual address to a physical address using 4 KB memory pages with 4 KB metadata granularity, showing prior art.

FIG. 3B depicts a block diagram of a page table configured for 4 KB memory pages with 4 KB metadata granularity, showing prior art.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure presents a method and system to track metadata (e.g., accessed and dirty bits) of memory pages at finer granularity than the size of the memory pages. A disclosed herein, modification to existing hardware design may enable finer page table granularity of metadata, leading to more precise representation of the state of memory and an improvement to system performance and efficiency. Finer grain dirty metadata can dramatically improve the efficiency and simplicity of subsystems.

Figure 1:
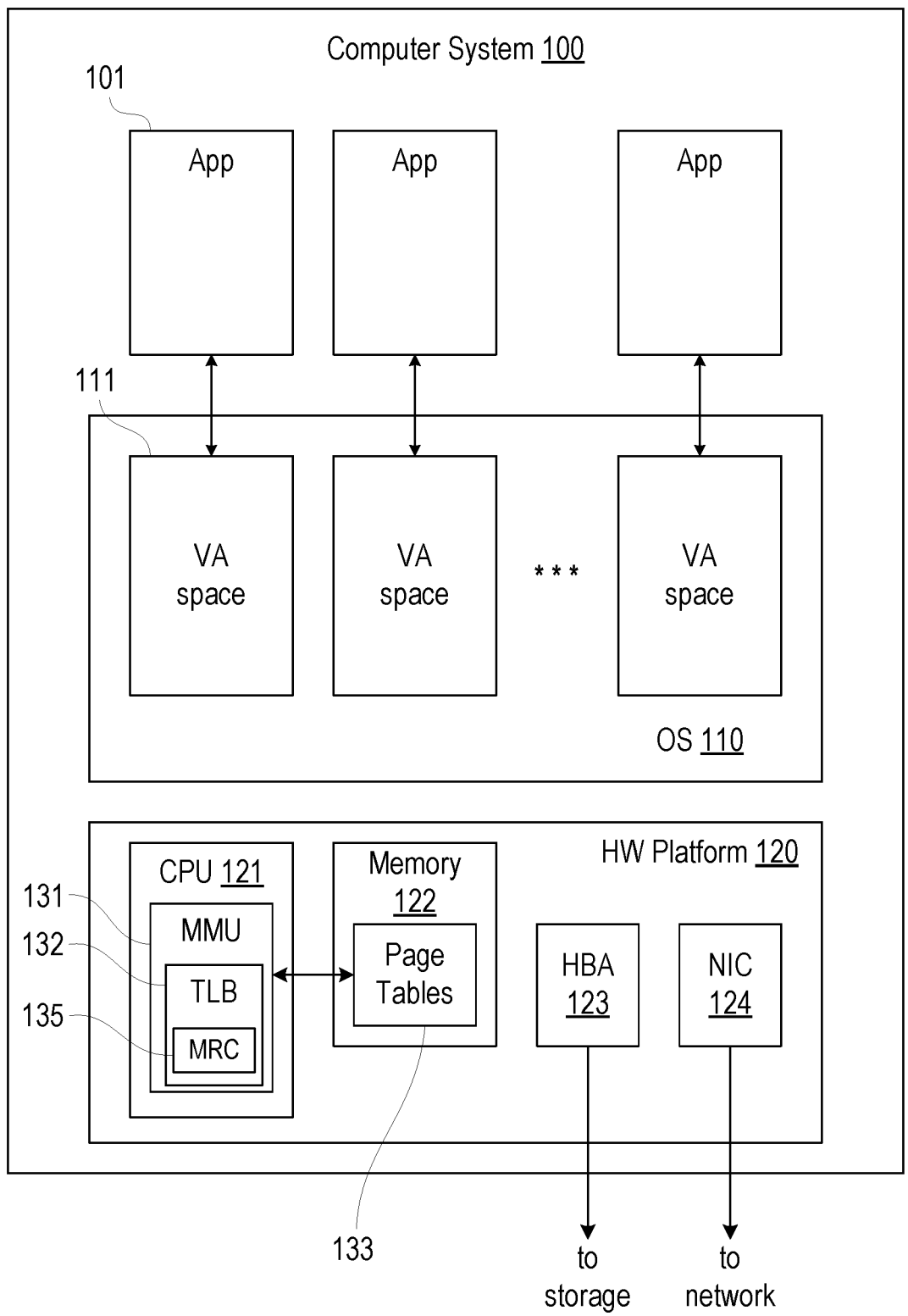
FIG. 1 depicts a block diagram of a computer system in which one or more embodiments of the present invention may be practiced.

FIG. 1 depicts a block diagram of a computer system 100 in which one or more embodiments of the present invention may be practiced. Computer system 100 includes multiple applications (Apps), including App 101, that are running on top of operating system (OS) 110. OS 110 includes a plurality of software layers including a kernel that manages hardware resources provided by hardware platform 120 through various drivers (not shown). OS 110 also manages a separate virtual address (VA) space for each of the applications that have been launched (e.g., VA space 111 for App 101). Hardware platform 120 includes one or more CPUs 121, system memory 122, a host bus adapter (HBA) 123 that connects computer system 100 to a persistent storage unit such as a disk array, and a network interface card (NIC) 124 that connects computer system 100 to a network. CPU 121 has an MMU 131 that carries out the mappings from the virtual address space to the physical address space using either a TLB 132 or page tables 133 stored in system memory 122. TLB 132 optionally includes a metadata registry cache (MRC) 135, which is a cache of a metadata registry (MR) 642/842 (see FIGS. 6B and 8B) that may be accessed by MMU 131 when translating a virtual address to a physical address. In an embodiment, MRC 135 may be a data structure of MMU 131 or CPU 121, and may not necessarily be a component of TLB 132. MRC 135 and MR 642/842 are further discussed below with reference to FIGS. 6A-6E and 8A-8F.

Figure 2:
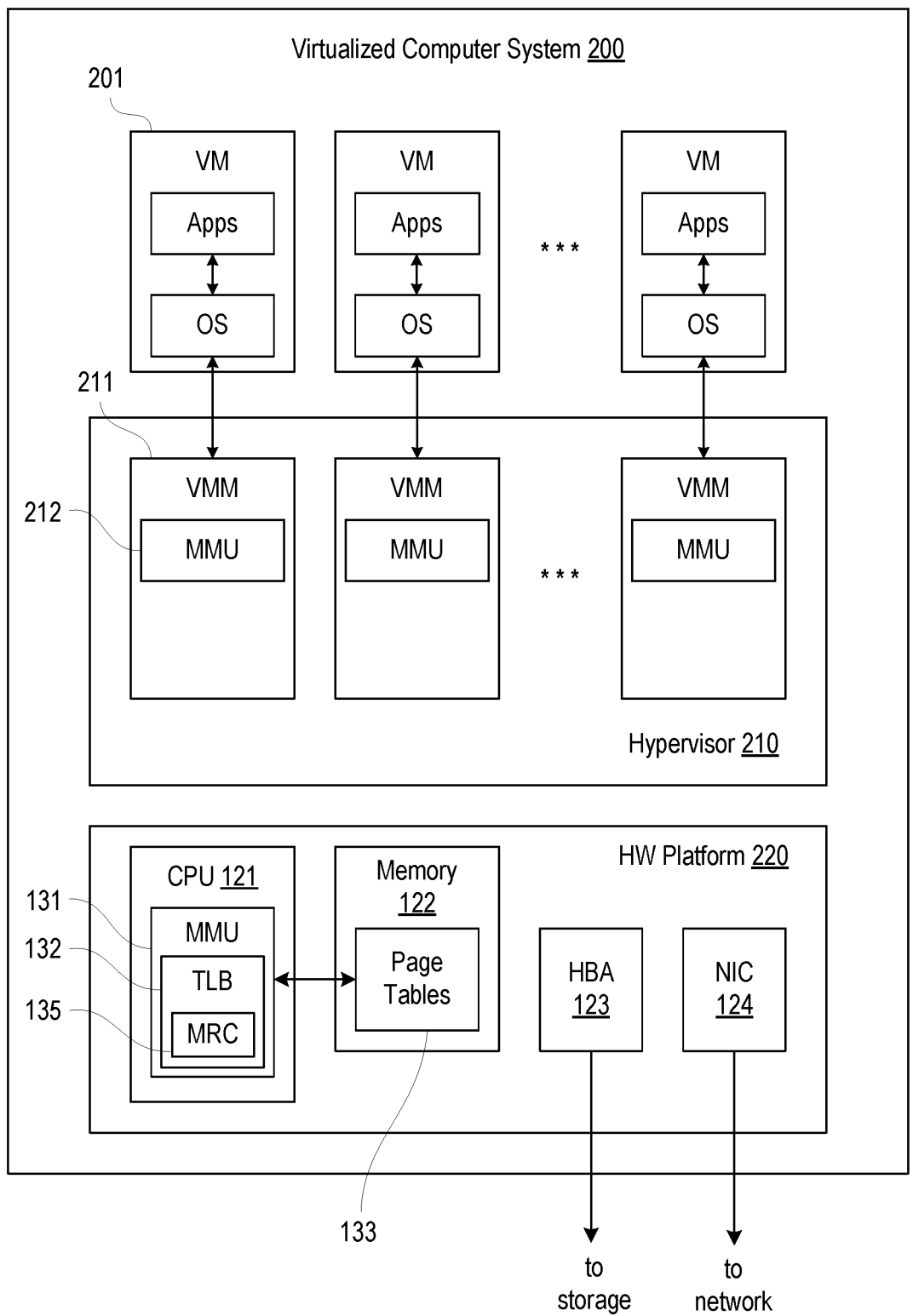
FIG. 2 depicts a block diagram of a virtualized computer system in which one or more embodiments of the present invention may be practiced.

FIG. 2 depicts a block diagram of a virtualized computer system 200 in which one or more embodiments of the present invention may be practiced. Virtualized computer system 200 includes multiple virtual machines (VMs), including VM 201, that are running on top of hypervisor 210. Each VM is an abstraction of a physical computer system having virtual hardware resources and a guest operating system that provides guest applications running in the VM an interface to the virtual hardware resources. Hypervisor 210 includes a plurality of software layers including a kernel that manages hardware resources of hardware platform 120 through various drivers (not shown), and virtual machine monitors (VMMs) each emulating hardware resources, such as an MMU, for a corresponding one of VMs. In the example illustrated in FIG. 2, VMM 211 emulates MMU 212 for VM 201.

In certain embodiments, hardware platform 220 is substantially the same as hardware platform 120 of FIG. 1. Hardware platform 220 includes one or more central processing units (CPUs) 121, system memory 122, a host bus adapter (HBA) 123 that connects virtualized computer system 200 to a persistent storage unit such as a disk array, and a network interface card (NIC) 124 that connects virtualized computer system 200 to a network. CPU 121 has a memory management unit (MMU) 131 that carries out the mappings from the virtual address space to the physical address space using either a translation look-aside buffer (TLB) 132 or page tables 133 stored in system memory 122. TLB 132 optionally includes a metadata registry cache (MRC) 135, which is a cache of metadata registry (MR) 642/842 (see FIGS. 6 and 8) that may be accessed by MMU 131 when translating a virtual address to a physical address. In an embodiment, MRC 135 may be a data structure of MMU 131 or CPU 121, and may not necessarily be a component of TLB 132. MRC 135 and MR 642/842 are further discussed below with reference to FIGS. 6A-6E and 8A-8F.

The page tables 133 stored in memory 122 include guest page tables and shadow page tables. Guest page tables are maintained by the guest operating system of a particular VM to provide mapping from guest virtual address space to guest physical address space. Shadow page tables are maintained by the VMM and provide mappings from the guest virtual address space directly to the physical address space of system memory 122. Although certain aspects herein are described with respect to virtual machines, the same techniques may be applies to a physical computer system that is not virtualized.

It should be recognized that the various terms, layers and categorizations used to describe the virtualization components in FIG. 2 may be referred to differently without departing from their functionality or the spirit or scope of the invention. One example of hypervisor 210 that may be used is included as a component of VMware's vSphere® product, which is commercially available from VMware, Inc. of Palo Alto, Calif. ("VMware"). It should further be recognized that other virtualized computer systems are contemplated, such as hosted virtual machine systems, where hypervisor 210 is implemented in conjunction with an operating system installed on hardware platform 220. In addition, further details of memory management techniques in virtualized computer systems, including a more detailed discussion of shadow page tables, are provided in U.S. patent application Ser. No. 12/137,351, filed Jun. 11, 2008, the entire contents of which are incorporated by reference herein.

Figures 4A, 4B:
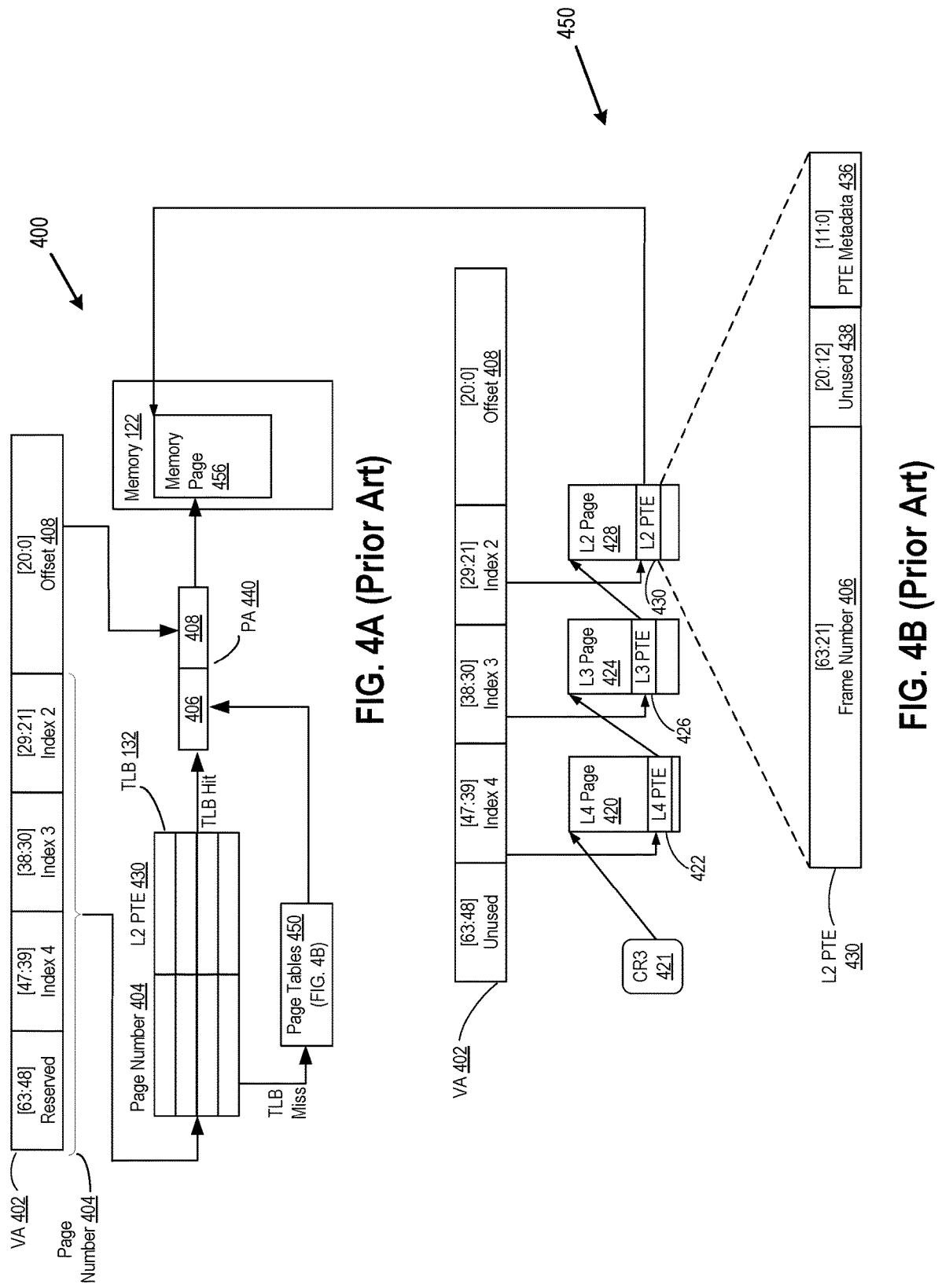
FIG. 4A depicts a block diagram of dataflow for translating a virtual address to a physical address using 2 MB memory pages with 2 MB metadata granularity, showing prior art.
FIG. 4B depicts a block diagram of a page table configured for 2 MB memory pages with 2 MB metadata granularity, showing prior art.
Figures 5A, 5B:
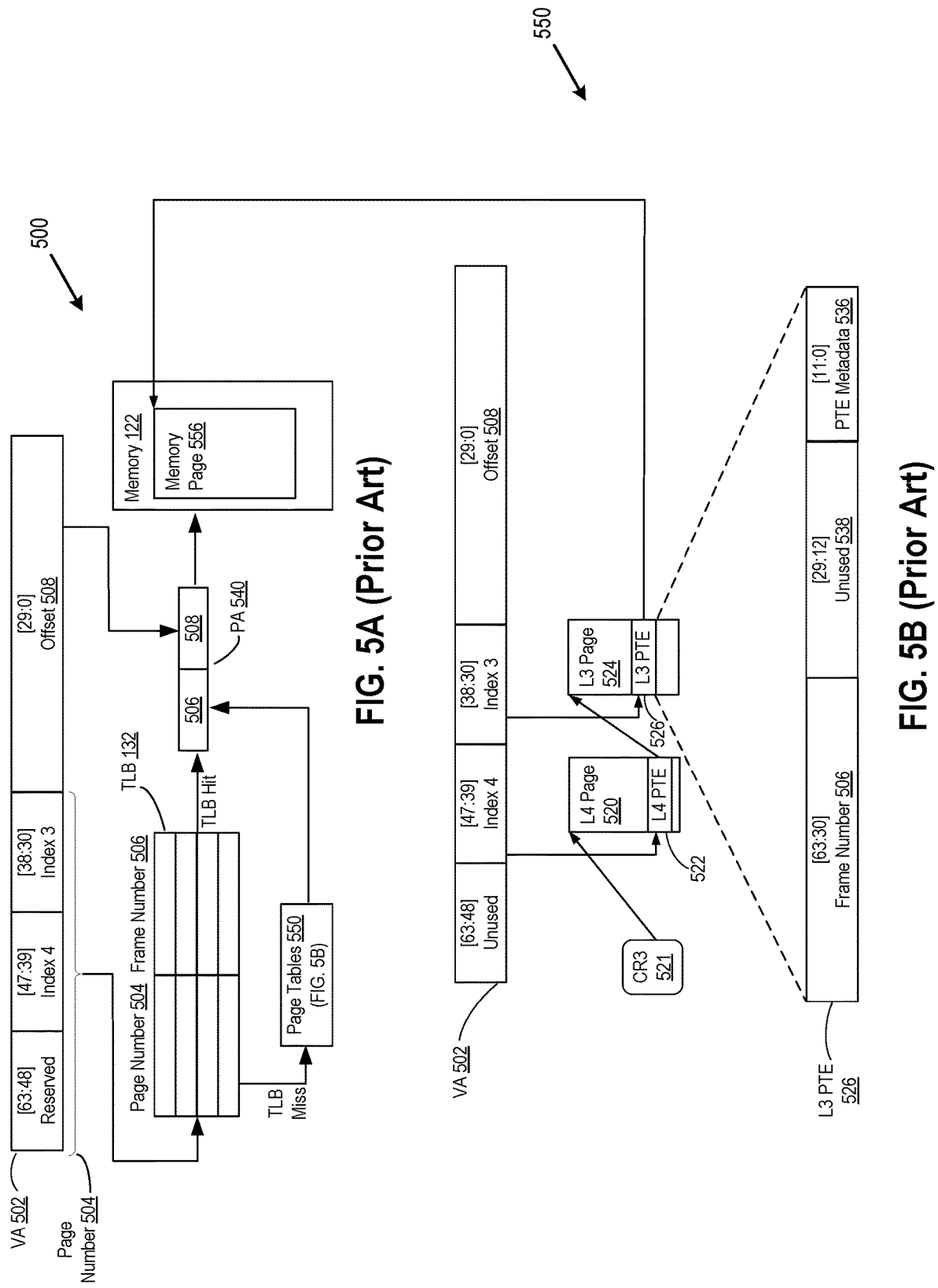
FIG. 5A depicts a block diagram of dataflow for translating a virtual address to a physical address using 1 GB memory pages with 1 GB metadata granularity, showing prior art.
FIG. 5B depicts a block diagram of a page table configured for 1 GB memory pages with 1 GB metadata granularity, showing prior art.

FIGS. 3A-5B depict dataflows for translating a virtual address (VA) 302 to a physical address (PA) 340 for applications that use 4 KB pages (FIGS. 3A and 3B), 2 MB pages (FIGS. 4A and 4B), and 1 GB pages (FIGS. 5A and 5B). FIGS. 3A-5B show prior art and are intended to give context to the invention shown in FIGS. 6A-9B. Although FIGS. 3A-5B discuss page tables ranging from a four-level page table (FIG. 3B) to a two-level page table (FIG. 5B), the teachings herein also apply to page tables that have more than four levels. The translation from VA to PA is performed by MMU 131 of CPU 121. It should be noted that alternatively to page tables shown in FIGS. 3B, 4B, and 5B, MMU 131 may use a shadow page table (not shown) to convert a virtual address into a physical address.

FIGS. 3A-5B shown an exemplary CPU, specifically a CPU constructed as per Intel's x86-64 architecture. It should be noted that although FIGS. 3A-5B show translation between a host virtual address a host physical address of a physical computer system, a person of ordinary skill would know how to apply the teachings herein to a translation between a guest virtual address to a guest physical address of a virtual machine, such as VM 201 of FIG. 2.

FIG. 3A depicts a dataflow 300 for translating a virtual address 302 to a physical address 340 using 4 KB memory pages with 4 KB metadata granularity, showing prior art. In the architecture shown in FIG. 3A, VA 302 is composed of 64 bits. Although VA 302 and other VAs discussed in the present disclosure are composed of 64-bits, a person of ordinary skill in the art would understand how to apply the teachings herein to virtual addresses of different lengths. Additionally, the quantity of bits within index 1, 2, 3, and 4 of VA 302 and of other virtual addresses discussed herein are exemplary and may vary with computer architecture. The 16 most significant bits (MSBs) (bits 63-48) may remain reserved or unused within VA 302. Page number 304 of VA 302 may be converted to frame number 306 that will be used within PA 340 to construct a final physical address 340. Frame number 306 may include of the same number of bits as page number 304, that is 52 bits, or a different number of bits. Frame number 306 represents a chunk of memory of 4 KB in size within memory 122, because the twelve least-significant bits of VA 302 have $2^{12}$ possible values, and each PA represents/points to one byte stored in memory 122, so the $2^{12}$ bits represent $2^{12}$ bytes, which is 4 KB. The twelve least-significant bits (LSBs) of VA 302 are the "offset" 308 obtained from VA 302. Offset 308, when concatenated to frame number 306, gives the final physical address 340 that maps to the beginning of requested data within memory page 356. Rather than concatenation, another way to think about obtaining PA 340 is to fill the 52 most significant bits of a 64-bit PA with frame number 306 while the 12 least-significant bits are set to zero. This 64-bit PA now points to the start of memory page 356 in memory 122. Offset 308 may then mathematically be added to the 64-bit PA to obtain final PA 340. In particular, offset 308 represents the offset from the start of memory page 356 to the final PA 340 in memory 122. Frame number 306 may be obtained either from TLB 132 or from page table 350 (FIG. 3B). Within TLB 132, frame number 306 is part of L1 page table entry (PTE) 334 in TLB 132, as shown at the bottom of FIG. 3B. The "L" in L1 stands for "level."

When translating VA 302 to PA 340, MMU 131 first checks whether the translation of this VA 302 has been cached in TLB 132. TLB 132 contains mappings (e.g., lookup table, hash table, etc.) from page number 304 to a PTE of the terminal page of page table 350 (see FIG. 3B). As used herein, a "terminal" page of a page table is the page containing page table entries that include frame numbers 306, which may be added to offset 308 or concatenated with offset 308 to obtain physical address 340.

If TLB 132 contains a cached mapping from page number 304 to L1 PTE 334 containing frame number 306, then MMU 131 can quickly construct PA 340, access memory 122, retrieve data or write data, and pass the data to the requesting application 101 if needed. After constructing PA 340, MMU 131 updates PTE metadata 336 in L1 PTE 334 of TLB 132. Either in parallel with this update or afterwards, MMU 131 also updates PTE metadata 336 of L1 PTE 334 of L1 page 332. It should be noted that L1 PTE 334 is located in two separated locations: (1) TLB 132 and (2) L1 page 332. These are two separate copies of L1 PTE 334. MMU 131 keeps them identical at almost all times by updating both in parallel with the same changes, or by updating one immediately after the other with the same changes. If TLB 132 does not contain a mapping from the particular page number 304 of VA 302 to L1 PTE 334, then MMU 131 does a page walk through page table 350 to obtain frame number 306, as shown in FIG. 3B. MMU 131 also modifies metadata bits of PTE metadata 336 within L1 page 332 and TLB 132, as needed, either serially or in parallel.

As shown in FIG. 3B, page table entry of the terminal page (L1 PTE 334) contains metadata in the 12 least-significant bits of its 64 bit range. This PTE metadata 336 is conventionally used to store information regarding the 4 KB chunk of memory 122 encompassed by 52-bit frame number 306. The 4 KB chunk of memory may also be referred to as a "memory page," in contrast to a page of page table 350. The metadata granularity PTE metadata 336 is 4 KB, because each bit of PTE metadata 336 applies to a 4 KB memory page of memory 122.

Metadata within PTE metadata 336 may include, for example, the following bits. A "valid" or "present" bit may indicate whether the memory page is currently stored within memory 122 or whether it needs to be swapped from disk (not shown). A "W" bit may indicated whether the memory page is writable, and a "U" bit may indicate whether the memory page is accessible by a user or a kernel only. PTE metadata 336 may also include a dirty bit and an accessed bit, as described above. Other metadata bits may be included in PTE metadata 336, such as a "PWT" bit indicating whether the page is write-transparent, a "PCD" bit indicating whether the page may be cached, and other bits. Such bits are architecture dependent and are defined by the ISA. Metadata bits such as present/valid, read, write, execute, accessed, and dirty are commonly found in most architectures.

After memory page containing PA 340 is accessed or modified, the metadata accessed bit or dirty bit within PTE metadata 336, respectively, is updated to reflect an access or modification to that page. The metadata bits of PTE metadata 336 may be modified within both, L1 page 332 and TLB 132, either serially or in parallel as further discussed with reference to FIGS. 7A-7E and 9A-9B, below.

FIG. 3B depicts a page table 350 configured for 4 KB memory pages with 4 KB metadata granularity, showing prior art. FIG. 3B shows dataflow in a "page walk" through page table 350. Page table 350 may be one of page tables 133 of FIGS. 1 and 2. When a TLB miss occurs, MMU 131 accesses register CR3 321. Register CR3 321 stores a physical address to the beginning of the outer page, shown as L4 page 320, of page table 350 stored in memory 122. A unique CR3 register 321 exists for each process running on CPU 121. The nine bits of VA 302 ranging from bit 47 to bit 39, denoted in FIG. 3B as index 4, serve as an index into L4 page 320, serving as an offset and pointing to location of L4 page table entry (PTE) 322. For example, if index 4 has a value of twenty-five, then the twenty-fifth entry of L4 page 320 is accessed. L4 PTE 322 has a frame number from which a 64-bit address may be created by concatenating zeroes as least significant bits, until the address is 64 bits in length. The 64-bit address points to the start of one of the pages in level 3 of page table 350, for example, to L3 page 324.

Each index in VA 302 is 9 bits, which means that each page at each of the four levels of page table 350 is 4 KB in size, as each entry (PTE) in the page table 350 is 64 bits and 9 bits represent $2^9=512$ PTEs, so 512*64 bits is 4 KB. Size of memory pages may vary independently of the size of pages in page table 350.

After obtaining an address of the start of L3 page 324 from L4 PTE 322, MMU 131 uses index 3 as an index into L3 page 324, obtaining address of start of L2 page 328, and then uses index 2 to index into L2 PTE 330 and obtain the physical address of the start of L1 page 332. L1 page 332 is the "terminal page" of the page walk, and contains PTEs that include frame number 306. If the 64-bit L1 PTE 334 sets its 12 least significant bits to 0, then the resulting 64-bit L1 PTE is a physical address of the beginning of memory page 356 containing PA 340, as shown by the arrow from FIG. 3B to 3A. MMU 131 may index into L1 page 332 using index 1, obtain frame number 306, concatenate or add frame number 306 to offset 308, and obtain PA 340. MMU may then access memory page 356 within memory 122, retrieve data or writes data, and pass the data to the requesting application 101 if needed. After PA 340 has been constructed, MMU 131 updates PTE metadata 336 in L1 PTE 334 of L1 page 332 and of TLB 132.

FIGS. 4A and 4B depict a dataflow 400 and page table 450 for 2 MB memory pages with 2 MB metadata granularity. FIG. 4A depicts a dataflow 400 for translating a virtual address 402 to a physical address 440 using 2 MB memory pages, showing prior art. FIG. 4B depicts a page table 450 configured for 2 MB memory pages, showing prior art. FIG. 4B also depicts a "page walk" through page table 450. Page table 450 may be one of page tables 133 of FIGS. 1 and 2. Dataflow 400 and page table 450 are similar to dataflow 300 and page table 350 of FIG. 3, respectively. However, page table 450 includes only three levels of pages—L4, L3, and L2—and is missing L1. Frame number 406 in page table 450 and dataflow 400 is forty-three bits long, which is nine bits shorter than frame number 306. The missing nine bits have been added to offset 408 of VA 402, creating an offset that is twenty-one bits long. Memory pages of physical memory 122 in dataflow 400 are 2 MB in size because each PA represents/points to one byte stored in memory 122, so the $2^{21}$ bits represent $2^{21}$ bytes, which is 2 MB. Page table 450 has pages (L4 page 420, L3 page 424, and L2 page 428) that are 4 KB in size, because indices 4, 3, and 2 of VA 402 are each nine bits in length, and each entry (PTE) in page table 450 is 64 bits. The number of PTEs is $2^9$=512 PTEs, and 512*64 bits is 4 KB. Page number 404 of VA 402 has shortened relative to page number 304, and includes bits 63 through 21, encompassing index 4, index 3, and index 2. Bits previously used for index 1 are now used for offset 408. L2 page 428 is the terminal page of page table 450, containing PTEs with frame number 406, PTE metadata 436, and nine unused bits 438. Nine unused bits 438 have been created as a result of shortening of frame number 406 by nine bits relative to frame number 306. Each frame number 406 encompasses a 2 MB block of memory (memory page 456) within memory 122. PTE metadata 436 is substantially the same as PTE metadata 336 and is updated in substantially the same way. PTE metadata 436 has a granularity of 2 MB, while PTE metadata 336 has a granularity of 4 KB.

FIGS. 5A and 5B depict a dataflow 500 and page table 550 for 1 GB memory pages with 1 GB metadata granularity. FIG. 5A depicts a dataflow 500 for translating a virtual address 502 to a physical address 540 using 1 GB memory pages, showing prior art. FIG. 5B depicts a page table 550 configured for 1 GB memory pages, showing prior art. FIG. 5B also depicts a "page walk" through page table 550. Page table 550 may be one of page tables 133 of FIGS. 1 and 2. Dataflow 500 and page table 550 are similar to dataflow 300 and page table 350 of FIG. 3, respectively. However, page table 550 includes only two levels of pages—L4 and L3—and is missing L1 and L2. Frame number 506 in page table 550 and dataflow 500 is thirty-four bits long, which is eighteen bits shorter than frame number 306. The missing eighteen bits have been added to offset 508 of VA 502, creating an offset that is thirty bits long. Memory pages of physical memory 122 in dataflow 500 are 1 GB in size because each PA represent/points to one byte stored in memory 122, so the $2^{30}$ bits represent $2^{30}$ bytes, which is 1 GB. Page table 550 has pages (L4 page 520 and L3 page 524) that are 4 KB in size, because indices 4 and 3 of VA 502 are each nine bits in length, and each entry (PTE) in page table 450 is 64 bits. The number of PTEs is $2^9$=512 PTEs, and 512*64 bits is 4 KB. Page number 504 of VA 502 has shortened relative to page number 304, and includes bits 63 through 30, encompassing index 4 and index 3. Bits previously used for index 1 and index 2 are now used for offset 508. L3 page 524 is the terminal page of page table 550, containing PTEs with frame number 506, PTE metadata 436, and eighteen unused bits 538. Eighteen unused bits 538 have been created as a result of shortening of frame number 506 by eighteen bits relative to frame number 306. Each frame number 506 encompasses a 1 GB block of memory (memory page 556) within memory 122. PTE metadata 536 is substantially the same as PTE metadata 336 and is updated in substantially the same way. PTE metadata 536 has a granularity of 1 GB, while PTE metadata 336 has a granularity of 4 KB.

FIGS. 6A-6E show an embodiment of the invention. FIGS. 6A-6E show a system to track metadata of memory pages at finer granularity than the size of the memory pages. This leads to more precise representation of the state of memory and to an improvement to system performance.

Figures 6A, 6B:
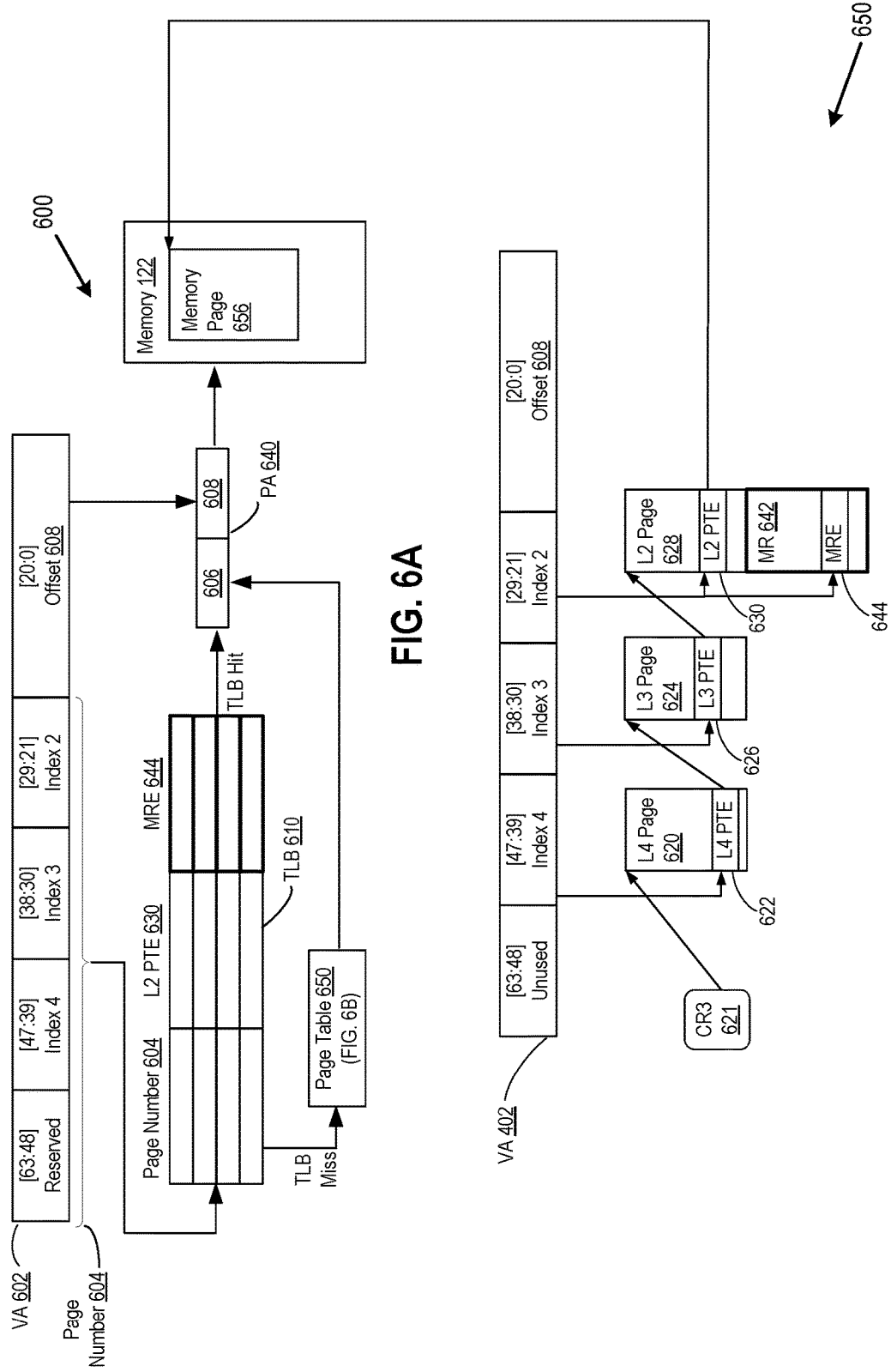
FIG. 6A depicts a dataflow for translating a virtual address to a physical address using 2 MB memory pages with 64 KB granularity, according to an embodiment.
FIG. 6B depicts a page table configured for 2 MB memory pages with 4 KB metadata granularity, according to an embodiment.

FIG. 6A depicts a dataflow 600 for translating VA 602 to a PA 640 using 2 MB memory pages with 64 KB granularity, according to an embodiment. FIG. 6B depicts a page table 650 configured for 2 MB memory pages with 4 KB metadata granularity, according to an embodiment. Page table 650 may be one of page tables 133 of FIGS. 1 and 2. FIG. 6A is a modification of FIG. 4A, and FIG. 6B is a modification of FIG. 4B in that all four of the FIGs. function with memory pages that are 2 MB in size and all function with a page table that is composed of three levels of pages (L4, L3, and L2). However, in FIGS. 4A and 4B, memory page metadata (i.e., PTE metadata 436) has a granularity that is equal in magnitude to memory page size. That is, FIG. 4A is a dataflow for 2 MB memory page size and 2 MB metadata granularity, and FIG. 4B is a page table for 2 MB memory page size and 2 MB metadata granularity. On the other hand, FIGS. 6A and 6B have memory page metadata granularity (i.e., contained in MRE 644, discussed below) that can be finer than memory page size of 2 MB. That is, the magnitude of metadata granularity in dataflow 600 and page table 650 can be smaller than the magnitude of memory page size containing PA 640. The improvement in granularity results from hardware modifications to CPU 121 and/or MMU 131 to include a modified TLB 610, as well as to include functionality for modified page table 650.

FIG. 6A shows a TLB 610 that has been modified relative to TLB 410 of FIG. 4A. The modification is the addition of L2 metadata registry entry (MRE) 644 to TLB 610. FIG. 6B shows a page table 650 that has been modified relative to page table 450 of FIG. 4B. The modification is the reservation of memory contiguous with L2 page 628, the size of reserved memory being equal to the size of L2 page 628, which in this example is 4 KB. The reserved memory space is metadata registry (MR) 642. Although MR 642 is shown in FIG. 6B as contiguous with L2 page 628, it is contemplated that MR 642 may be located within memory 122 such that MR 642 is not contiguous with L2 page 628, and, for example, a pointer may be created and set to point to the start of MR 642. Although FIGS. 6A and 6B show a modification of CPU 121 to improve metadata granularity of 2 MB memory pages, a person of ordinary skill in the art would understand how to apply the teachings herein to improve granularity of memory pages of other sizes, such as of 1 GB memory pages. Also, although MR 642 is shown as being equal in size to L2 page 628, a person of ordinary skill in the art would understand how to apply the teachings herein to create an MR 642 of varying sizes to vary the metadata granularity achieved, an example of which is provided in FIGS. 8A-9B.

Figure 6C:
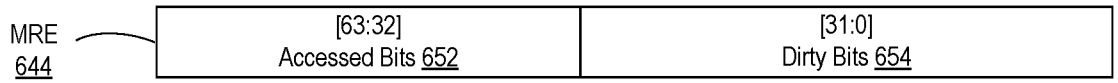
FIG. 6C depicts a block diagram of an exemplary metadata registry entry, according to an embodiment.

Page table 650 includes MR 642. MR 642 may be 4 KB in size containing 512 entries, each of 64 bits in length. L2 page 628 is also 4 KB in size containing 512 entries, each of 64 bits in length. Thus, there is a one-to-one correspondence of entries in L2 page 628 and entries in MR 642. An exemplary MR entry 644 is shown in FIG. 6C. MR entry (MRE) 644 contains 32 accessed bits and 32 dirty bits. Each MRE 644 applies to a single L2 PTE 630. That is, MMU 131 may access the first 64-bit MRE in MR 642 to obtain accessed bit and dirty bit metadata for the first 64-bit PTE in L2 page 628. After accessing the particular MRE 644 that corresponds with L2 PTE 630, MMU 131 may then access the particular bit of MRE 644 to obtain information on a 64 KB chunk of 2 MB memory page 656 that contains PA 640. For example, the first dirty bit of MRE 644 may indicate whether the first 64 KB chunk of memory page 656 has been recently updated. The second dirty bit of MRE 644 may indicate whether the second 64 KB chunk of memory page 656 has been recently updated, etc. Within page table 650, the following formulas may apply for accessing L2 PTE 628 and its corresponding MRE 644:

PA of L2 PTE 630=PA of L2 Page 628+index 2*64 bits

PA of MRE 644=PA of L2 Page 628+4 KB+index 2*64 bits

Or, in a more general sense, the formulas may be:

PA of Terminal PTE=PA of Terminal Page+Index into Terminal Page*Size of PTE

PA of MRE=A of Terminal Page+Size of Terminal Page+Index into Terminal Page*Size of MRE After a TLB miss and a page walk through page table 650, when MRE 644 is updated in MR 642, MRE 644 in TLB 610 is also updated by MMU 131. After a TLB hit, when MRE 644 is updated in TLB 610, MRE 644 in page table 650 is also updated by MMU 131. Although MRE 644 is shown in FIG. 6C as containing only accessed and dirty bits, it is contemplated that MRE 644 may include metadata other than accessed and dirty bits, or different numbers of accessed bits as compared to dirty bits. Metadata granularity may be determined the number of bits used to represent a type/category of metadata, with more bits resulting in finer granularity and less bits resulting in coarser granularity.

As explained with reference to FIGS. 4A and 4B above, 2 MB memory pages usually have a single dirty bit and a single accessed bit to indicate whether the 2 MB memory page has been recently accessed or recently modified, respectively. This is a 2 MB metadata granularity. With 32 accessed bits and 32 dirty bits in MRE 644, a 2 MB memory page may achieve a 32-fold improved granularity. That is, each bit of MRE 644 may apply to a 1/32 chunk of the 2 MB memory page, which is a 64 KB chunk of memory. For example, the first accessed bit of MRE 644 may indicate whether the first 64 KB chunk of a memory page has been recently accessed. The second accessed bit of MRE 644 may indicate whether the second 64 KB chunk of a memory page has been recently accessed, etc. The same technique may be applied to the dirty bits. When MR 642 is implemented within page table 650 to track accessed and dirty bit metadata, there is no need to use PTE metadata 636 of L2 PTE 630 to track the metadata type that is also tracked by MR 642. For example, if MRE 644 consists of accessed and dirty bit metadata, then accessed and dirty bit metadata does not need to be tracked within PTE metadata 636.

In a similar manner as described above, MR 642 may be applied to an L3 page of FIG. 5B to improve granularity of 1 GB pages. With 32 accessed bits and 32 dirty bits in MRE 644, a 1 GB memory page may achieve a 32-fold improved granularity. That is, each bit of MRE 644 may apply to a 1/32 chunk of the 1 GB memory page, which is a 32 MB chunk of memory, achieving a 32 MB granularity for accessed and dirty metadata of 1 GB memory pages.

It is advantageous for the efficient functioning of TLB 610 to contain metadata for memory pages referenced by frame numbers 606 cached by TLB 610. To maintain such efficiency, TLB 610 has been modified to include MR entries 644. MR entries 644 map to the page table entry, such as L2 PTE 630, that contains frame number 606 pointing to memory page 656 (e.g., along with other data, such as additional metadata about memory page 656). Memory page 656 contains PA 640, which is the translation of VA 602. As used herein, the term "pointing" when referring to a frame number pointing to a location in memory means taking a 64-bit entry containing frame number 606 and setting all bits other than the frame number bits set to zero, and the resulting 64-bit entry is a physical address pointing to a location in memory (i.e., start of a memory page). For example, with reference to FIG. 6D, frame number 606 of FIG. 6D "points" to a location in memory represented by a 64-bit address in which bits 63-21 are the same as frame number 606 of FIG. 6D, and bits 20-0 are set to zero. In FIG. 6B, frame number 606 of L2 PTE 630 is pointing to the beginning of page 656, as shown by the arrow from FIG. 6B to FIG. 6A.

In other words, in addition to or alternative to metadata for page 656 being contained within PTE metadata 636, metadata for memory page 656 is contained within MRE 644. A one-to-one correspondence between L2 PTE 630 and MRE 644 is maintained within TLB 610. In order to access fine-grained metadata for memory page 656 pointed to by frame number 606 of L2 PTE 630, MMU 131 accesses MRE 644 that is mapped to the L2 PTE 630 within TLB 610.

Figure 6D:
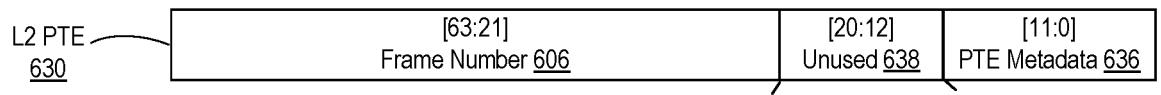
FIG. 6D depicts a block diagram of an exemplary page table entry, according to an embodiment.

FIG. 6D depicts a block diagram of an exemplary L2 PTE 630. Bits 63-21 may be frame number 606, bits 20-12 may be unused bits 638 meaning that bits 20-12 are not used by MMU 131 in conventional operations of page table 650 configured for 2 MB memory pages 656. Bits 11-0 may be PTE metadata 636, which may or may not be used when MR 642 is implemented in page table 650. Any of the bits that are not used within L2 PTE 630, such as unused bits 638, may be reserved as an "MRE present" bit to indicate whether an MRE entry exists for L2 PTE 630. The MRE present bit may indicate in a large sense whether MR 642 has been implemented in page table 650 and whether it has been turned on or off for the process or application 101 that has passed VA 602 to MMU 131. Although MR 642 may be implemented for page table 650, the operating system, process or application 101 that passed VA 602, or the user may choose whether to use MR 642 for application 101 that is being launched or that is running, or whether to use MR 642 for a particular section of memory 122. A user, process, or application 101 may indicate the choice of whether to use MR 642 by making a call before running application 101, such as for example an "mmdconfig" call in a Windows® operating system.

Figure 6E:
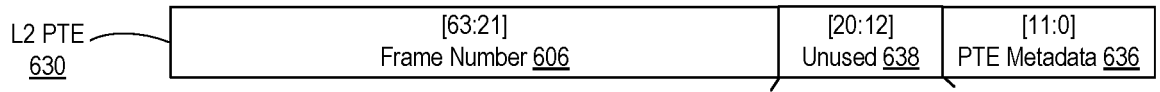
FIG. 6E depicts a block diagram of an exemplary page table entry showing an alternative use of unused bits, according to an embodiment.

FIG. 6E depicts a block diagram of an exemplary L2 PTE 630 showing an alternative use of unused bits 638. MRE 644 is able to achieve 64 KB metadata granularity of 2 MB memory pages by allocating 32 bits to dirty bits and 32 bits to accessed bits. However, granularity may range anywhere from 2 MB (coarsest granularity) to 64 KB (finest granularity) when 32 bits are allocated for a metadata type. Variable granularity between maximum and minimum granularity may be custom-encoded into a portion of a page table entry, such as within L2 PTE 630. The custom encoding may be coded into the 9 unused bits 638 to be read by MMU 131 or other components during translation of VA 602 to PA 640. Exemplary encoding may include one MRE present bit as discussed above, several (e.g., three) bits for granularity of accessed bits, and several (e.g., three) bits for granularity of dirty bits. For example, the granularity may indicate the number of bits used in the MRE to represent accessed bits or dirty bits. The number of bits that encode granularity may vary as needed to accommodate varying magnitudes of granularity. If three bits are used to encode granularity, then for example, a "001" encoding may indicate that a 2-bit granularity and that a page is to be divided into ½ chunks of 2 MB=1 MB, a "010" encoding may indicate that a 4-bit granularity and that a page is to be divided into ¼ chunks of 2 MB=0.5 MB, a "100" encoding may indicate that a 16-bit granularity and that a page is to be divided into ⅟₁₆ chunks of 2 MB=128 KB, and a "101" encoding may indicate that a 32-bit granularity and that a page is to be divided into ⅟₃₂ chunks of 2 MB=64 KB as shown in FIG. 6C showing 32 bit granularity.

The operating system, process or application 101 that passed VA 602, or the user may automatically set or indicate the desired level of granularity to be encoded into a page table entry, such as into L2 PTE 630. A user, process, or application 101 may indicate the level of granularity by making a call before running an application 101, such as for example an "mmdconfig" call in a Windows® operating system. An exemplary call may be "int mmdconfig (void*addr, size t_len, int mdtype, int bits)," where "mdtype" parameter indicates metadata type and "bits" parameter indicates bit granularity. A process, application 101, or user may set metadata granularity for all 2 MB pages in an address space by passing NULL for the starting address "*addr" parameter, or for a specific region of an address space described by starting address "*addr" and length of memory "len" parameter.

FIGS. 7A-7E depict a flow diagram of a method 700 of translating VA 602 to a PA 640 by CPU 121 implementing MR 642, according to an embodiment. Process 700 is performed by MMU 131. At block 702, MMU 131 receives VA 602 from application 101 or from a process. The VA may be associated, by CPU 121, with an operation that is to be performed on data that is stored at the VA (i.e., at the PA to which the VA translates). The operation may be, for example, a Read, Load, or a Write operation. At block 704, MMU 131 checks whether VA 602 or a portion of VA 602, such as page number 604, has a cached entry in TLB 610. If so, then method 700 continues to block 706 of FIG. 7B to quickly construct PA 640 with frame number 606 and offset 608. If, TLB 610 does not have a cached entry for VA 602, then method 700 continues to block 724 to perform a page walk to obtain frame number 606 and construct PA 604.

At block 706 (FIG. 7B), MMU 131 constructs physical address 640 from frame number 606, which is obtained from within L2 PTE 630 of TLB 610. It should be noted that L2 PTE 630 may not necessarily be a "level 2" PTE if MR 642 is implemented, for example, to correspond with entries in L3 page 624 and to work with 1 GB memory pages.

At block 708, MMU 131 begins to update the metadata for the portion of memory 122 containing PA 640, at the granularity level that has been implemented and chosen. At block 708, MMU 131 checks whether metadata registry 642 has been implemented and turned on. Finer granularity of metadata registry 642 may be turned on automatically by OS 110 or hypervisor 210, or manually by application 101 or a user. Implementing MR 642 on CPU 121 designed for conventional processing described in FIGS. 3A through 5B would require a modification of the hardware of CPU 121. MMU 131 may determine whether MR 642 has been implemented and chosen by checking a MRE present bit within L2 PTE 630, such as within unused bits 638 shown in FIG. 6D.

If MR 642 has not been implemented or has not been chosen, then method 700 continues to blocks 710 and 712, where metadata is updated within PTE metadata 636 as per conventional method and dataflow described with reference to FIGS. 4A and 4B above. That is, in block 710, MMU 131 updates PTE metadata 636 within TLB 610, and in block 712, MMU 131 updates PTE metadata 636 within L2 PTE 630 of L2 page 628 to match PTE metadata 636 of TLB 610. Blocks 710 and 712 may be performed in series or in parallel.

If MR 642 has been implemented and chosen, method 700 continues from block 708 to block 714. At block 714, MMU 131 obtains granularity of metadata for each type/category of metadata. For example, MR 642 may include improved granularity of accessed and dirty metadata, but not other type of metadata. Block 714 may be an optional block, as CPU 121 may be configured to function at a given granularity. MMU 131 may obtain granularity from within unused bits 638 of L2 PTE 630, as per encoding described with reference to FIG. 6E. MMU 131 may also obtain granularity from OS 110 or hypervisor 210.

At block 716, MMU 131 uses obtained granularity to update metadata. FIG. 7C expands block 716 into blocks 720 and 722, and shows block 716 in more detail. At block 720, MMU 131 updates metadata registry entry 644 of TLB 610. For example, if PA 640 was associated with a write request, both accessed and dirty bits would be set to 1 for the chunk of memory page 656 containing PA 640. If memory page 656 is a 2 MB page and granularity of accessed and dirty bits is set at 32-bit granularity as shown in FIG. 6C, then accessed and dirty bits of MRE 644 corresponding to the 64 KB chunk would be set to 1. Along with updating metadata in MRE 644 of TLB 610, MMU 131 may also update any metadata within PTE metadata 636 of L2 PTE 630 in TLB 610, as needed. Blocks 720 and 722 may be performed in series or in parallel.

At block 722, MMU 131 updates MRE 644 of MR 642 within page table 650 to match MRE 644 of TLB 610. Along with updating metadata in MRE 644 of MR 642, MMU 131 may also update metadata within PTE metadata 636 of L2 PTE 630 in page table 650, as needed.

Figure 7A:
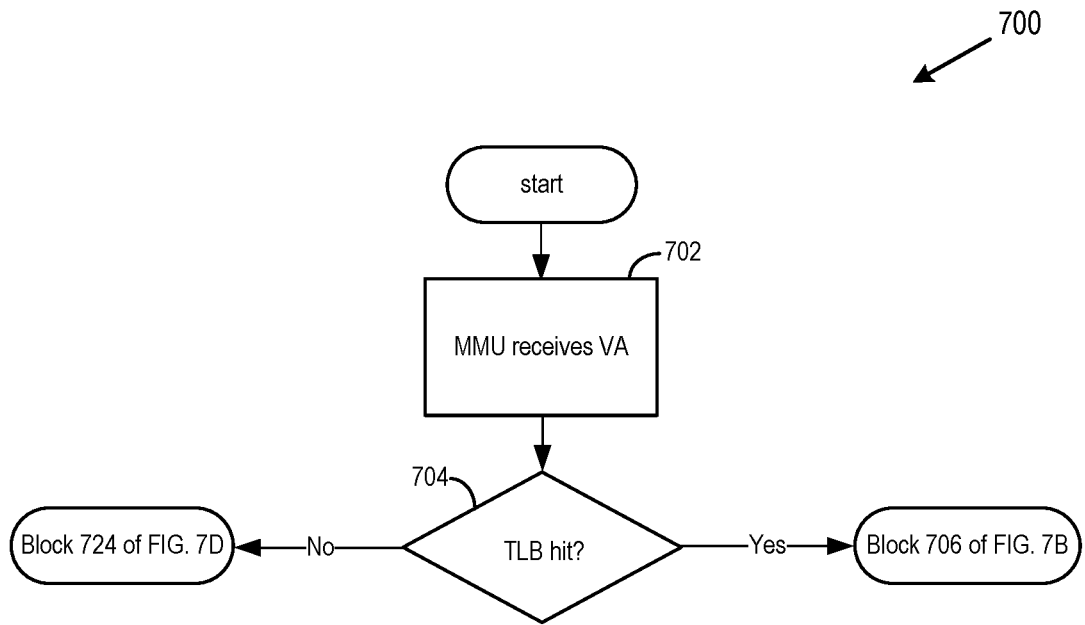
FIGS. 7A-7E depict a flow diagram of a method of translating a virtual address to a physical address by a CPU implementing a metadata registry.
Figure 7B:
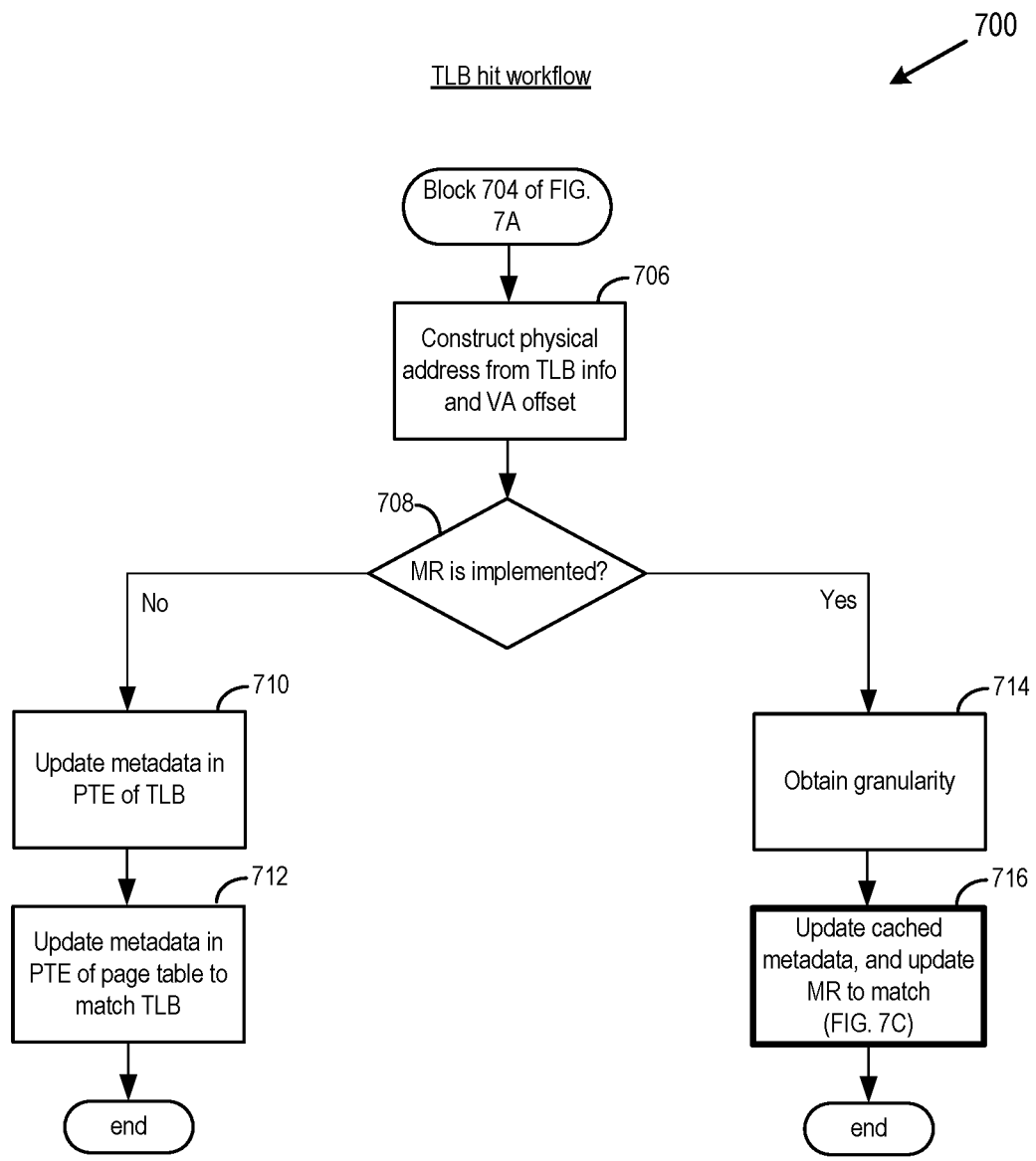
Figure 7C:
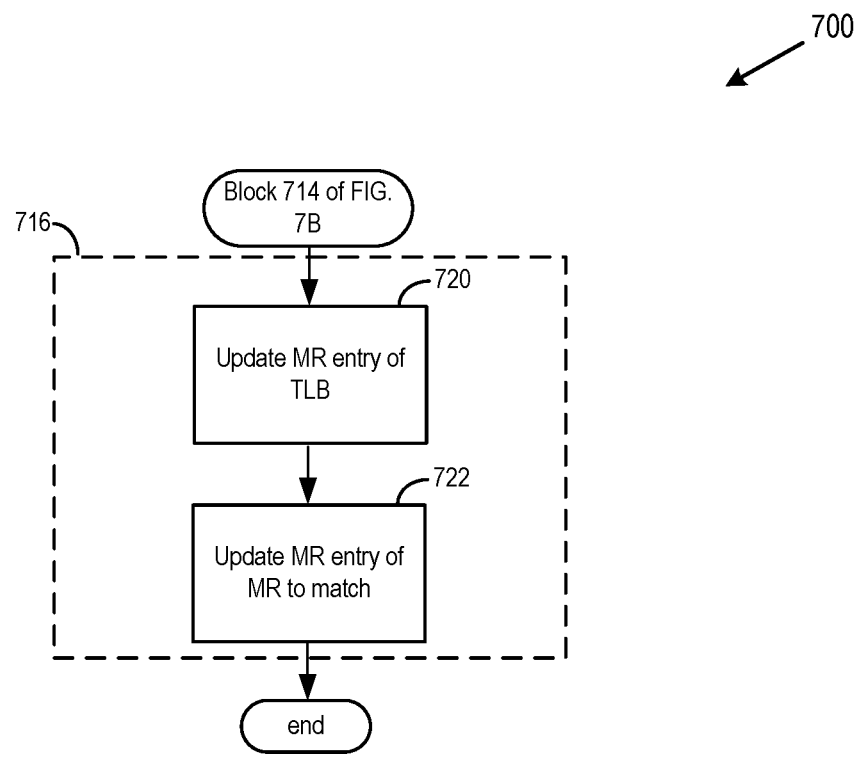
Figure 7D:
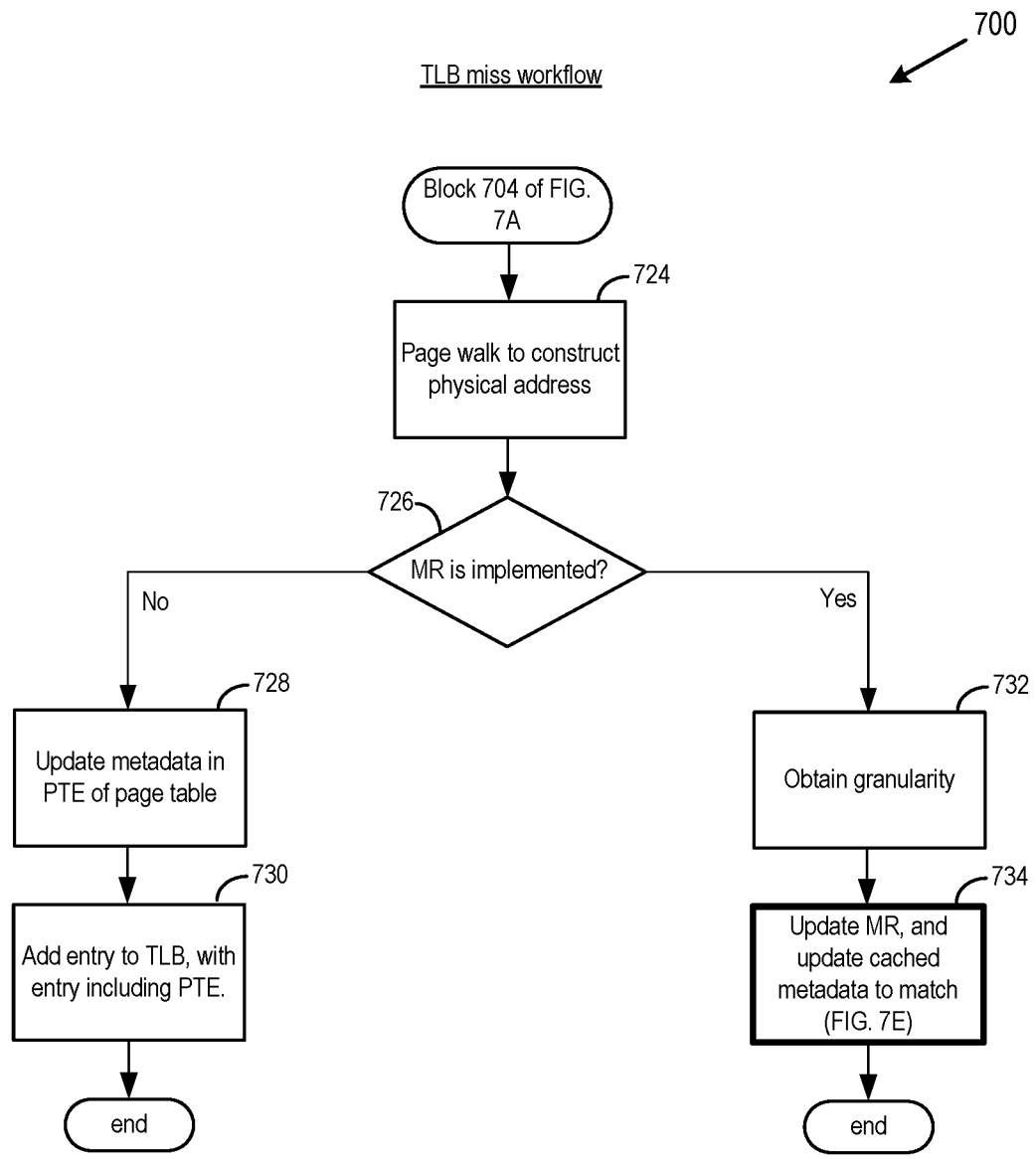

Returning to block 704 of FIG. 7A, if VA 602 results in a TLB miss, then method 700 continues to block 724 of FIG. 7D. At block 724 (FIG. 7D), MMU 131 page walks through page table 650 to reach L2 PTE 630 of L2 page 628. MMU 131 obtains frame number 606 from L2 PTE 630 of L2 page 628, and constructs physical address 640 and offset 608. Alternatively to a page walk through page table 650, MMU 131 may translate between a virtual address and a physical address using a shadow page table (not shown). It should be noted that L2 PTE 630 may not necessarily be a "level 2" PTE if MR 642 is implemented, for example, to correspond with entries in L3 page 624 and to work with 1 GB memory pages.

At block 726, MMU 131 begins to update the metadata for the portion of memory 122 containing PA 640, at the granularity level that has been implemented and chosen. MMU 131 checks whether metadata registry 642 has been implemented and turned on. The steps performed at block 726 are similar to those performed at block 708 of FIG. 7B.

If MR 642 has not been implemented or has not been chosen, then method 700 continues to blocks 728 and 730, where metadata is updated within PTE metadata 636 as per conventional method and dataflow described with reference to FIGS. 4A and 4B above. That is, in block 728, MMU 131 updates PTE metadata 636 within L2 PTE 630 of L2 page 628, and in block 730, MMU 131 creates a new entry within TLB 610 to include L2 PTE 630 with PTE metadata 636, matching that in L2 page 628 of page table 650. Blocks 728 and 730 may be performed in series or in parallel.

If MR 642 has been implemented and chosen, method 700 continues from block 726 to block 732. At block 732, MMU 131 obtains granularity of metadata for each type/category of metadata, similarly to how metadata granularity was obtained at block 714 of FIG. 7B.

Figure 7E:
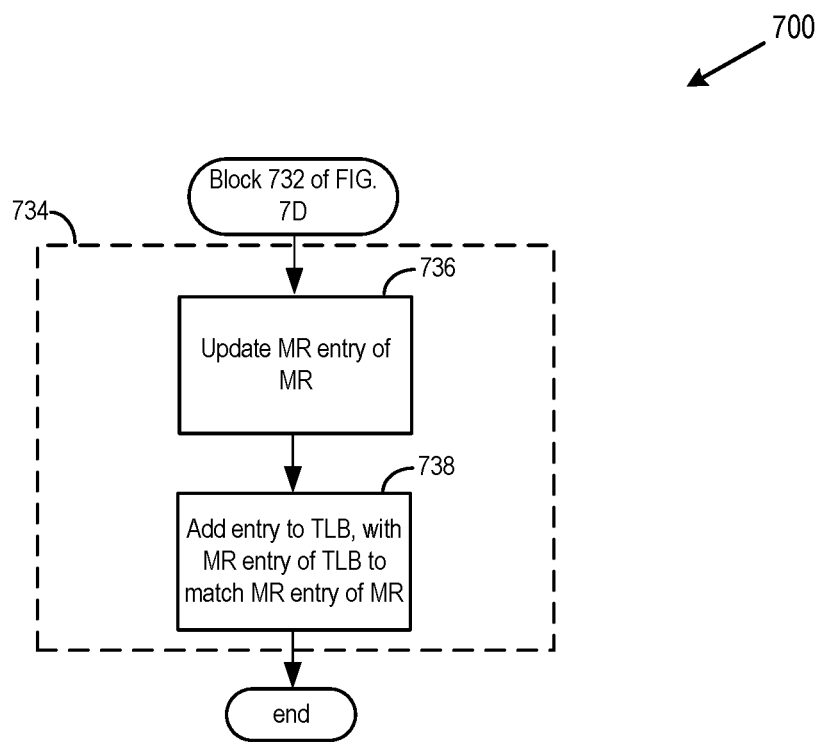

At block 734, MMU 131 uses obtained granularity to update metadata. FIG. 7E expands block 734 into blocks 736 and 738, and shows block 734 in more detail. At block 736, MMU 131 updates metadata registry entry 644 of MR 642 within page table 650. Along with updating metadata in MRE 644 of MR 642, MMU 131 may also update any metadata within PTE metadata 636 of L2 PTE 630 in L2 page 628, as needed.

At block 738, MMU 131 creates a new entry within TLB 610 with MRE 644 of TLB 610 matching MRE 644 of MR 642. The new entry within TLB 610 may also include L2 PTE 630 with PTE metadata 636 of L2 PTE 630 of TLB 610 matching that of L2 PTE 630 of L2 page 628.

Figure 8A:
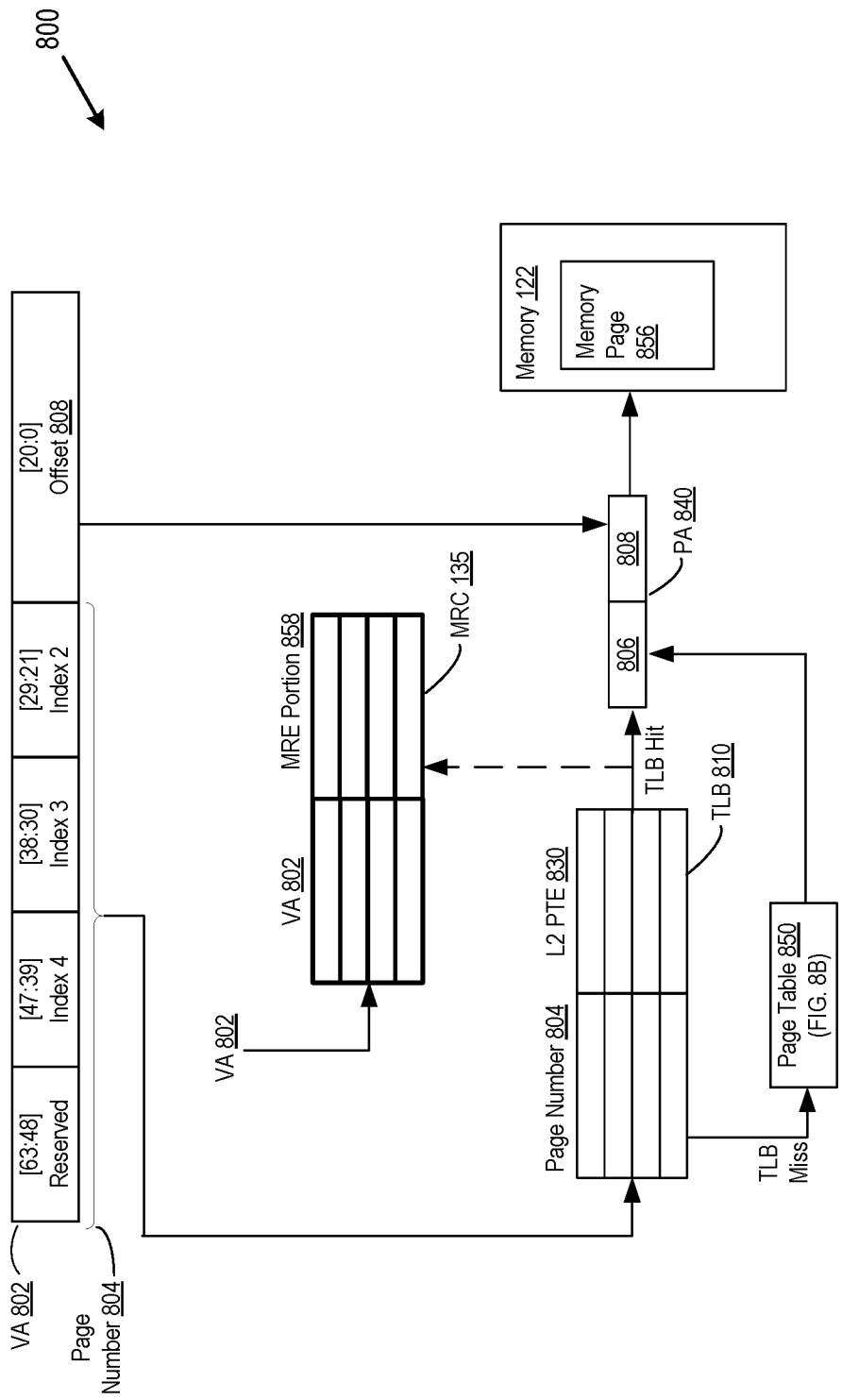
FIG. 8A depicts a dataflow for translating a virtual address to a physical address using 2 MB memory pages with 8 KB granularity and low TLB resource usage, according to an embodiment.
Figure 8B:
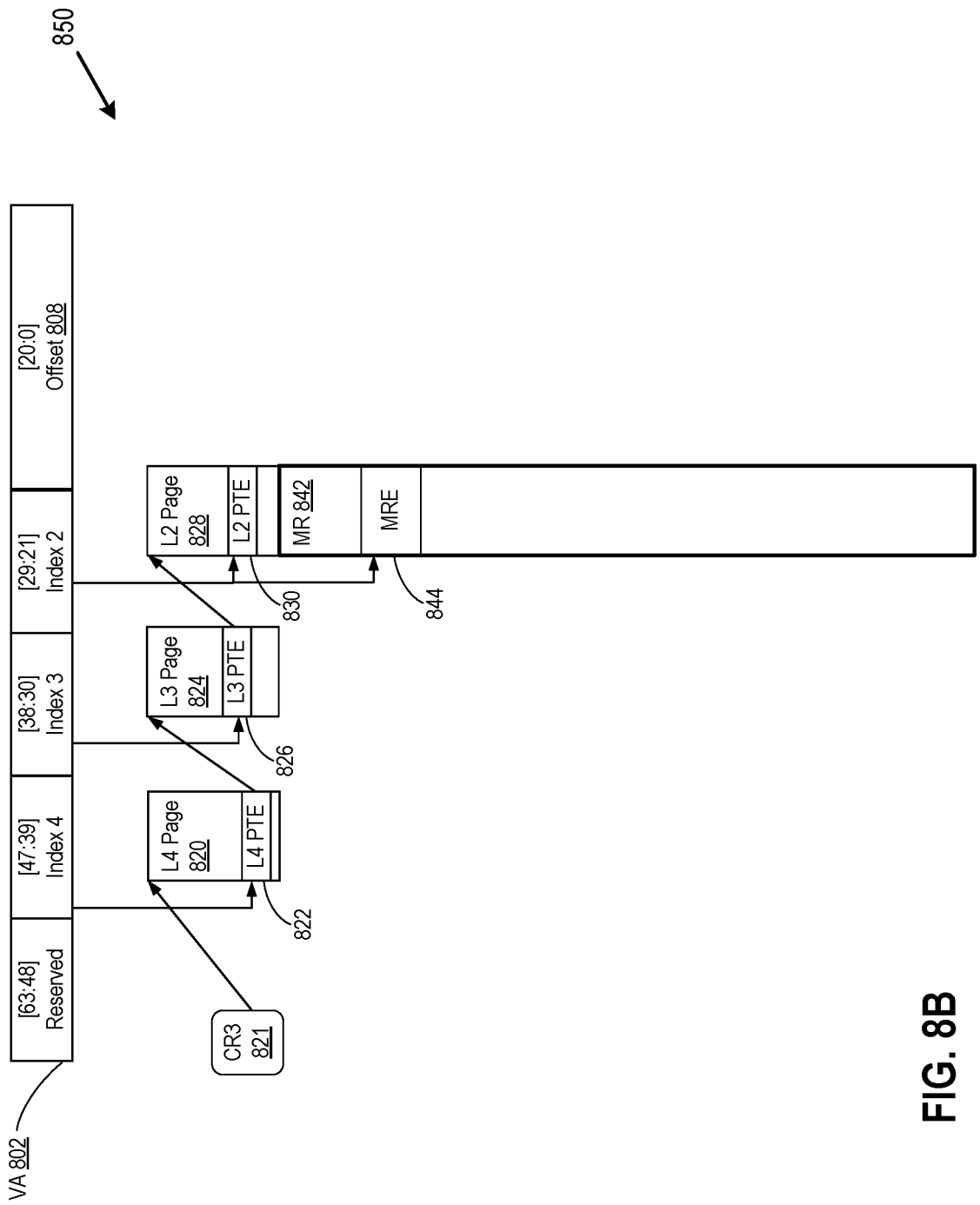
FIG. 8B depicts a page table configured for 2 MB memory pages with 8 KB metadata granularity with low TLB resource usage, according to an embodiment.

FIG. 8A depicts a dataflow 800 for translating VA 802 to a PA 840 using 2 MB memory pages with 8 KB granularity and low TLB resource usage, according to an embodiment. FIG. 8B depicts a page table 850 configured for 2 MB memory pages with 8 KB metadata granularity with low TLB resource usage, according to an embodiment. Page table 850 may be one of page tables 133 of FIGS. 1 and 2. FIGS. 8A and 8B, as well as 9A and 9B, teach how to achieve fine metadata granularity (e.g., an 8 KB metadata granularity of 2 MB pages) without a large increase in TLB size. The exemplary dataflow 800 and page table 850 of FIGS. 8A and 8B, respectively, use 2 MB memory pages 856 and a three-level (L4, L3, and L2) page table 850. However, a person of ordinary skill in the art would understand how to apply the teachings herein to improve granularity of memory pages that are of different sizes, such as of 1 GB memory pages.

Figure 8C:
FIG. 8C depicts a block diagram of an exemplary metadata registry entry, according to an embodiment.
Figure 8D:
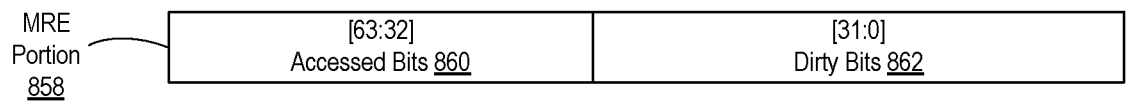
FIG. 8D depicts a block diagram of exemplary metadata registry entry portion within a metadata registry cache, according to an embodiment.

FIG. 8B shows MR 842. MR 842 is larger in size than L2 page 828. Specifically, L2 page 828 may be 4 KB in size, while MR 842 may be eight times larger, or 32 KB in size. L2 MRE 844 is similar to L2 MRE 644 of FIG. 6B, but L2 MRE 844 is 512 bits in size, which is eight times larger than L2 MRE 644. FIG. 8C depicts an exemplary L2 MRE 844. The first 256 bits are accessed bits 852 and the second 256 bits are dirty bits 854. The 256-bit granularity allows a 2 MB block of memory (memory page 856) to have a metadata granularity of 8 KB (2 MB divided by 256 is 8 KB). Although MR 842 is shown in FIG. 8B as contiguous with L2 page 828, it is contemplated that MR 842 may be located within memory 122 such that MR 842 is not contiguous with L2 page 628, and, for example, a pointer may be created and set to point to the start of MR 842.

MR 842 functions similarly to MR 642. MR 842 may be 32 KB in size containing 512 entries, each entry being 512 bits in length (for a total size of 32 KB). L2 page 828 is 4 KB in size containing 512 entries, each entry being 64 bits in length. Thus, there is a one-to-one correspondence of entries in L2 page 828 and entries in MR 842. MMU 131 may access the first 512-bit MRE in MR 842 to obtain accessed bit and dirty bit metadata for the first 64-bit PTE in L2 page 828. After accessing the particular MRE 844 that corresponds with L2 PTE 630, MMU 131 may then access the particular bit of MRE 844 to obtain information on an 8 KB chunk of 2 MB memory page 856 that contains PA 840. For example, the first dirty bit of MRE 844 may indicate whether the first 8 KB chunk of memory page 856 has been recently updated. The second dirty bit of MRE 844 may indicate whether the second 8 KB chunk of memory page 856 has been recently updated, etc. Within page table 850, the following formulas may apply to access L2 PTE 828 and its corresponding MRE 844:

PA of L2 PTE 830=PA of L2 Page 828+index 2*64 bits

PA of MRE 844=PA of L2 Page 628+4 KB+index 2*512 bits

Or as stated above, the generic version of the formulas may be:

PA of Terminal PTE=PA of Terminal Page+Index into Terminal Page*Size of PTE

PA of MRE=PA of Terminal Page+Size of Terminal Page+Index into Terminal Page*Size of MRE FIG. 8A shows a TLB 810 that is the same as TLB 410 of FIG. 4A. However, a new data structure has been added: the metadata registry cache (MRC) 135. MRC 135 may be part of TLB 810 or MRC 135 may be a separate data structure from TLB 810, maintained within MMU 131 or CPU 121. MRC is quickly accessible by MMU 131 upon a TLB hit. MRC 135 performs a similar function to MRE 644 within TLB 610 of FIG. 6A. That is, MRC 135 attempts to have fine-grained metadata readily available for MMU 131 so that MMU 131 may access and update the fine-grained metadata when a TLB hit occurs during translation of VA 802 to PA 640. However, placing the entire 512-bit MRE 644 within TLB 810 may use too many resources. The solution provided by MRC 135 is to cache a portion of the 512-bit MRE 644 within MRC 135. The size of the portion may vary, and may be for example, 4 bits, 8 bits, 16 bits, 32 bits, 64 bits, or 128 bits. For illustration purposes, it may be assumed that MRE portion 858 of FIG. 8A is 64-bits in length. The portion cached may correspond to the portion of the memory page 856 addressed by the VA 802/PA 640.

For example, the 512-bit MRE 644 may be divided starting from the LSB to the MSB into MRE portions 858 of a size (e.g., 64-bits). If the MRE 644 is divided into 64-bit MRE portions 858, there would be 512/64=8 such MRE portions 858, each including metadata corresponding to a portion of the 8 KB chunk represented by the entire 512-bit MRE 644. In particular, each of the eight 64-bit MRE portions 858 of the 512-bit MRE 644 includes metadata for 8 KB/8=1 KB of memory page 856. Therefore, the TLB 810 may be configured to store the 64-bit MRE portion 858 of the 512-bit MRE 644 that includes metadata corresponding to the 1 KB of memory page 856 that includes the byte represented by the VA 802 in the same entry in TLB 810. VA 802 may serve as an index into MRC 135, with all or a portion of VA 802 being compared to virtual addresses being translated by MMU 131 to determine whether a TLB hit or a TLB miss has occurred.

Figure 8E:
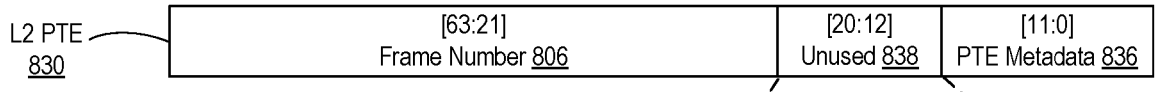
FIG. 8E depicts a block diagram of an exemplary page table entry, according to an embodiment.

FIG. 8E depicts a block diagram of an exemplary L2 PTE 830, according to an embodiment. L2 PTE 830 is substantially similar to L2 PTE 630 of FIG. 6D. Any of the bits that are not used within VA 602, such as unused bits 838, may be reserved as an "MRE present" bit to indicate whether an MRE entry exists for L2 PTE 830. The MRE present bit may indicate whether MR 842 has been implemented in page table 850 and whether it has been turned on or off for the process or application 101 that passed VA 802 to MMU 131. A user, process, or application 101 may indicate the choice of whether to use MR 642 by making a call before running application 101, such as for example an "mmdconfig" call in a Windows® operating system.

Figure 8F:
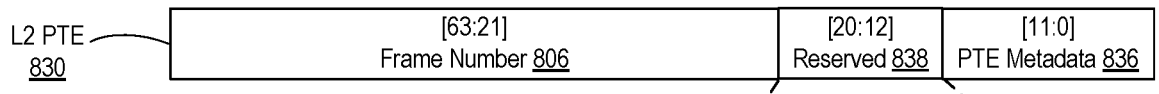
FIG. 8F depicts a block diagram of an exemplary page table entry showing an alternative use of unused bits, according to an embodiment.

FIG. 8F depicts a block diagram of an exemplary L2 PTE 630 showing an alternative use of unused bits 838, according to an embodiment. MRE 844 is able to achieve 8 KB metadata granularity of 2 MB memory pages by allocating 256 bits to dirty bits and 256 bits to accessed bits. However, granularity may range anywhere from 2 MB (coarsest granularity) to 8 KB (finest granularity) when 256 bits are allocated for a metadata type. Variable granularity between maximum and minimum granularity may be custom-encoded into a portion of a page table entry, such as within L2 PTE 830. The custom encoding may be coded into the 9 unused bits 838 to be read by MMU 131 or other components during translation of VA 602 to PA 640. Exemplary encoding may include one MRE present bit as discussed above and several (e.g., three or eight) bits for granularity of dirty bits and accessed bits. Encoding similar to that discussed with reference to FIG. 6E, above, may be used, with code "111" referring to 256-bit encoding. Or, eight bits may be used for encoding metadata, with the granularity being equal for all metadata categories tracked in MR 842. The number of bits that encode granularity may vary as needed to accommodate varying magnitudes of granularity.

The operating system, process or application 101 that passed VA 602, or the user may automatically set or indicate the desired level of granularity to be encoded into a page table entry, such as into L2 PTE 630. A user, process, or application 101 may indicate the level of granularity by making a call, such as for example an "mmdconfig" call in a Windows® operating system, as discussed above.

Figure 9A:
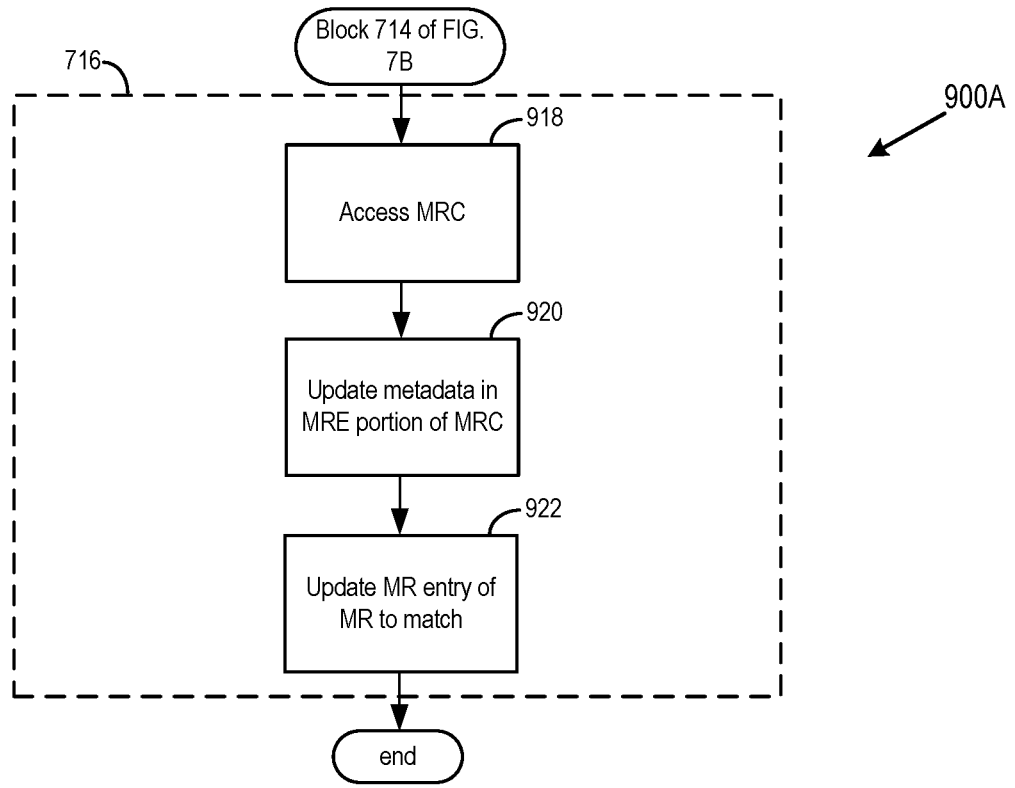
FIG. 9A depicts a flow diagram of a method that may be substituted for block 716 of FIG. 7B, according to an embodiment.
Figure 9B:
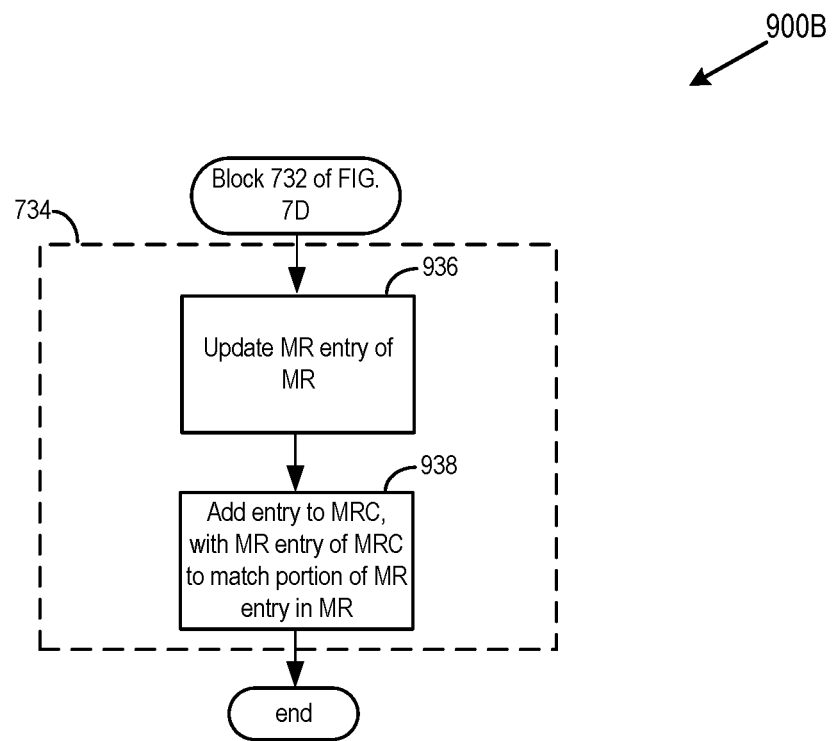
FIG. 9B depicts a flow diagram of a method that may be substituted for block 734 of FIG. 7D, according to an embodiment.

Method 700, which applies to dataflow 600 and page table 650 of FIGS. 6A through 6E, may be slightly modified to apply to dataflow 800 and page table 850 of FIGS. 8A through 8F. FIG. 9A depicts a flow diagram of a method 900A that may be substituted for block 716 of method 700, according to an embodiment. FIG. 9B depicts a flow diagram of a method 900B that may be substituted for block 734 of method 700, according to an embodiment. When both substitutions are made, method 700 as modified by methods 900A and 900B as well as with a modified block 704, may be used to translate a virtual address to a physical address with an 8K granularity and low TLB resource usage. It should be noted that components in FIGS. 6A through 6E that are similar to components in FIG. 8A through 8F are numbered similarly. For example, VA 602 of FIG. 6A is substantially similar to VA 804 of FIG. 8A. Thus, descriptions of method 700 above that use numbering of FIG. 6A through 6E are applicable to FIGS. 8A through 8F except that the numerals in the 600 series are modified to be in the 800 series of FIGS. 8A through 8F.

First, block 704 of method 700 must be modified such that a TLB hit occurs only if an MRC hit within MRC 135 also occurs. An MRC hit would occur if one of MRE portions 858 within MRC 135 contains metadata for the chunk of memory encompassing PA 840.

Referring to FIG. 9A, block 918 occurs after block 714 of FIG. 7B. Block 714 of FIG. 7B is in the TLB hit workflow, and occurs if MR 842 is implemented and chosen. At block 714, MMU 131 obtains granularity and then proceeds to block 918 of method 900A to update metadata of memory chunk encompassing PA 840 that had been constructed at block 706.

At block 918, MMU 131 accesses MRC so as to update metadata of an 8 KB chunk of memory of 2 MB memory page 856. The 8 KB chunk of memory encompasses PA 840.

At block 920, MMU 131 evaluates VA 802 passed by application 101 to access the correct entry within MRC 135 that contains MRE portion 858 with metadata of chunk of memory encompassing PA 840. MMU 131 updates the metadata within the appropriate MRE portion 858, as needed. Along with updating metadata in MRE portion 858 of MRC 135, MMU 131 may also update any metadata within PTE metadata 836 of L2 PTE 830 in TLB 810, as needed.

At block 922, MMU 131 updates the bits of MRE 844 of MR 842 that reflect metadata for chunk of memory encompassing PA 840 to match the metadata in MRE portion 858 that was modified in block 920. Along with updating metadata in MRE 844 of MR 842, MMU 131 may also update metadata within PTE metadata 836 of L2 PTE 830 of page table 850, as needed. After block 922, method 700 ends.

Referring to FIG. 9B, block 936 occurs after block 732 of FIG. 7D. Block 732 of FIG. 7D is in the TLB miss workflow, and occurs if MR 842 is implemented and chosen. At block 732, MMU 131 obtains granularity and then proceeds to block 936 of method 900B to update metadata of memory chunk containing PA 840 that had been constructed at block 724.

At block 936, MMU 131 updates appropriate metadata bits in the 512-bit metadata registry entry 844 of MR 842 within page table 850. Along with updating metadata in MRE 844 of MR 842, MMU 131 may also update any metadata within PTE metadata 836 of L2 PTE 830 in L2 page 828, as needed.

At block 938, MMU 131 creates a new entry within MRC 135 with MRE portion 858 of MRC 135 matching the portion of MRE 844 containing metadata for the chunk of memory page 856 encompassing PA 840. If needed, MMU 131 may also create a new entry within TLB 810 to include L2 PTE 830 with PTE metadata 836, matching that in L2 page 828 of page table 850. After block 938, method 700 ends.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of translating a virtual address to a physical address, the method using memory pages with size of a memory page magnitude, the method operating on a central processing unit (CPU) configured to track metadata with a metadata granularity magnitude that is smaller than the memory page magnitude, the method comprising:
   receiving an operation to be performed on data stored at the virtual address;
   locating a page table entry (PTE) within a page table based on the virtual address, the PTE containing a frame number and original metadata, the frame number pointing to a portion of memory, the original metadata associated with the portion of the memory as a whole;
   locating a metadata registry entry (MRE) within a metadata registry (MR) that corresponds to the PTE based on the virtual address, the MRE containing metadata for the portion of memory, the metadata being a version of the original metadata except being associated with distinct regions of the portion of the memory rather than the portion of the memory as a whole; and
   updating the metadata in the MRE based on the operation.

2. The method of claim 1, further comprising updating a metadata registry cache (MRC) to include an MRC entry comprising a portion of the MRE.

3. The method of claim 1, further comprising updating a translation lookaside buffer (TLB) to include a TLB entry comprising the MRE.

4. The method of claim 1, wherein the metadata for the portion of memory comprises at least two bits, and the at least two bits provide information on a single category of metadata.

5. The method of claim 4, wherein the at least two bits are all either accessed metadata bits or dirty metadata bits.

6. The method of claim 1, wherein the MR is contiguous in memory with a page of the page table.

7. The method of claim 6, wherein a size of the MR is equal to a size of the page of the page table.

8. The method of claim 6, wherein the size of the MR is an integer multiple of the size of the page of the page table.

9. A non-transitory computer-readable storage medium comprising instructions, which when executed by a computing system, causes the computing system to carry out instructions for translating a virtual address to a physical address, wherein the computing system uses memory pages with size of a memory page magnitude, the computing system comprising a central processing unit (CPU) configured to track metadata with a metadata granularity magnitude that is smaller than the memory page magnitude, the instructions comprising:

receiving an operation to be performed on data stored at the virtual address;

locating a page table entry (PTE) within a page table based on the virtual address, the PTE containing a frame number and original metadata, the frame number pointing to a portion of memory, the original metadata associated with the portion of the memory as a whole;

locating a metadata registry entry (MRE) within a metadata registry (MR) that corresponds to the PTE based on the virtual address, the MRE containing metadata for the portion of memory, the metadata being a version of the original metadata except being associated with distinct regions of the portion of the memory rather than the portion of the memory as a whole; and updating the metadata in the MRE based on the operation.

10. The non-transitory computer-readable storage medium of claim 9, the instructions further comprising updating a metadata registry cache (MRC) to include an MRC entry comprising a portion of the MRE.

11. The non-transitory computer-readable storage medium of claim 9, the instructions further comprising updating a translation lookaside buffer (TLB) to include a TLB entry comprising the MRE.

12. The non-transitory computer-readable storage medium of claim 9, wherein the metadata for the portion of memory comprises at least two bits, and the at least two bits provide information on a single category of metadata.

13. The non-transitory computer-readable storage medium of claim 12, wherein the at least two bits are all either accessed metadata bits or dirty metadata bits.

14. The non-transitory computer-readable storage medium of claim 9, wherein the MR is contiguous in memory with a page of the page table.

15. The non-transitory computer-readable storage medium of claim 14, wherein a size of the MR is equal to a size of the page of the page table.

16. The non-transitory computer-readable storage medium of claim 14, wherein the size of the MR is an integer multiple of the size of the page of the page table.

17. A system comprising a central processing unit (CPU) and memory, wherein the system is configured to translate a virtual address to a physical address using memory pages with size of a memory page magnitude, the CPU configured to track metadata with a metadata granularity magnitude that is smaller than the memory page magnitude, wherein the system is further configured to:

receive an operation to be performed on data stored at the virtual address;

locate a page table entry (PTE) within a page table based on the virtual address, the PTE containing a frame number and original metadata, the frame number pointing to a portion of memory, the original metadata associated with the portion of the memory as a whole;

locate a metadata registry entry (MRE) within a metadata registry (MR) that corresponds to the PTE based on the virtual address, the MRE containing metadata for the portion of memory, the metadata being a version of the original metadata except being associated with distinct regions of the portion of the memory rather than the portion of the memory as a whole; and update the metadata in the MRE based on the operation.

18. The system of claim 17, wherein the system is further configured to update a metadata registry cache (MRC) to include an MRC entry comprising a portion of the MRE.

19. The system of claim 17, wherein the system is further configured to update a translation lookaside buffer (TLB) to include a TLB entry comprising the MRE.

20. The system of claim 17, wherein the metadata for the portion of memory comprises at least two bits, and the at least two bits provide information on a single category of metadata.

* * * * *